United States Patent [19]

Ueda

[11] Patent Number: 4,981,344

[45] Date of Patent: Jan. 1, 1991

[54] WIDE ANGLE LENS SYSTEM FOR USE IN COPYING MACHINE

[75] Inventor: Toshihiko Ueda, Osaka, Japan

[73] Assignee: Minolta Camera Kabushiki Kaisha, Osaka, Japan

[21] Appl. No.: 436,317

[22] Filed: Nov. 13, 1989

[30] Foreign Application Priority Data

Nov. 14, 1988 [JP] Japan ................................ 63-288633
Dec. 8, 1988 [JP] Japan ................................ 63-310676
Jun. 6, 1989 [JP] Japan ................................ 1-143533

[51] Int. Cl.$^5$ .......................... G02B 9/64; G02B 13/18
[52] U.S. Cl. ..................................... 350/463; 350/432; 350/450
[58] Field of Search ........................ 350/463, 450, 432

[56] References Cited

U.S. PATENT DOCUMENTS 3,922,071 11/1975 Kitagawa et al. .
4,560,242 12/1985 Tokuhara et al. .
4,561,730 12/1985 Lawson et al. .
4,738,517 4/1988 Nishina et al. .

FOREIGN PATENT DOCUMENTS 57-67909 4/1982 Japan .

Primary Examiner—Bruce Y. Arnold
Assistant Examiner—Rebecca D. Gass
Attorney, Agent, or Firm—Price, Gess & Ubell

[57] ABSTRACT

A wide angle lens system having, from the object side, a first lens of a negative refractive power, a second lens of a positive meniscus lens, a third lens of a negative meniscus lens, a fourth lens of a positive meniscus lens, a diaphragm, a fifth lens being symmetrical with the fourth lens with respect to the diaphragm, a sixth lens being symmetrical with the third lens with respect to the diaphragm, a seventh lens being symmetrical with the second lens with respect to the diaphragm, and a eighth lens being symmetrical with the first lens. Each of the first and eighth lenses may have an aspherical surface in rotation symmetry with each other with respect to the diaphragm. Also, some of the lenses may be made of synthetic resin.

18 Claims, 13 Drawing Sheets

WIDE ANGLE LENS SYSTEM FOR USE IN COPYING MACHINE

BACKGROUND OF THE INVENTION

1. Field of the Invention

The present invention relates to wide angle lens systems, and more particularly to a wide angle lens system for use in copying machines of the full exposure type wherein the entire surface of a document is exposed to light at a time to project the light reflected from the surface on a photosensitive member.

2. Description of the Related Art

The document exposure systems for copying machines heretofore known are those of the slit exposure type and those of the full exposure type. With the slit exposure type, the photosensitive member is continuously exposed to an image of the document in the form of a slit using a projection lens system which can be relatively narrow in the angle of view, whereas the machines of this type have the drawback of being relatively low in copying speed since the entire surface of the document must be exposed to light by a scanning movement. On the other hand, the full exposure type is adapted for a high-speed copying operation since the document need not be scanned, but the projection lens system must have a very wide angle of view for exposing the photosensitive member to the entire document image at a time.

Stated more specifically with reference to FIG. 1 showing the full exposure system for copying machines, an image of a document 1 on a document support table 2 is projected on a photosensitive belt 3 by a projection lens system 4. Because of this arrangement, the conjugate distance L between the document 1 and the photosensitive belt 3 exerts a great influence on the size of the entire copying machine. To make the copying machine compact, there is a need to decrease the conjugate distance L and therefore to give a very wide angle of view to the projection lens system 4. It is desired that the projection lens system 4 to be used be 60 degrees or greater in the angle of view $2\omega$.

SUMMARY OF THE INVENTION

Accordingly, the main object of the present invention is to provide a wide angle lens system having a very wide angle of view and suitable for use in copying machines of the full exposure type.

Another object of the invention is to provide a wide angle lens system which is bright and compact although having a very wide angle of view.

Another object of the invention is to provide a wide angle lens system exhibiting satisfactory lens performance over the entire image surface.

Another object of the invention is to provide a wide angle lens system which comprises aspherical lenses, has a wide angle of view and nevertheless exhibits satisfactory lens performance.

Still another object of the invention is to provide a lightweight, compact and inexpensive wide angle lens system comprising lenses of synthetic resin.

BRIEF DESCRIPTION OF THE DRAWINGS

These and other objects or features of the present invention will become apparent from the following description of preferred embodiments thereof taken in conjunction with the accompanying drawings, in which.

In the following description, like parts are designated by like reference numbers throughout several drawings.

DESCRIPTION OF THE PREFERRED EMBODIMENTS

First to third embodiments of the invention will be described below with reference to the drawings.

Figure 1:
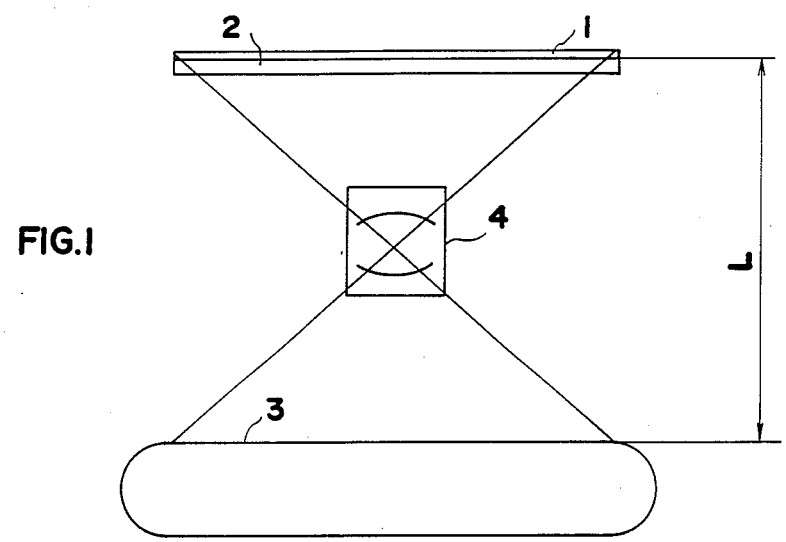
FIG. 1 is a diagram showing the construction of the projection optical system of a copying machine of the full exposure type.
Figure 2:
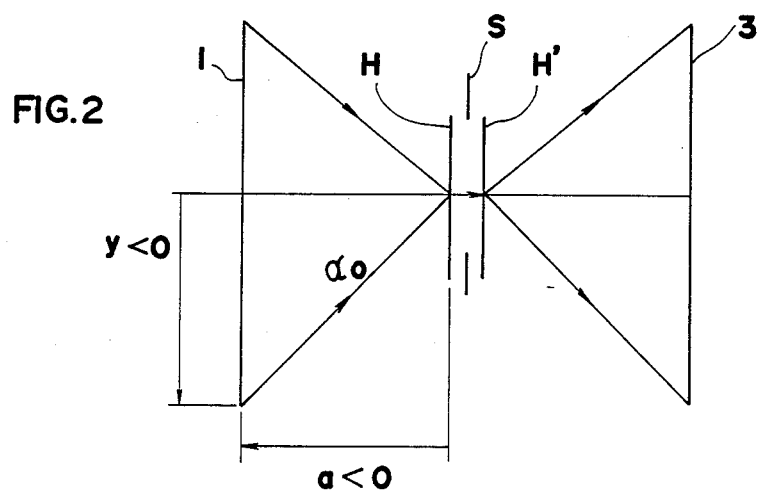
FIG. 2 is an optical path diagram showing the paraxial arrangement of the projection optical system of FIG. 1.

FIG. 2 is a diagram showing the paraxial arrangement of the projection optical system of FIG. 1 for use in full exposure type copying machines. The projection optical system is perfectly symmetrical with respect to a diaphragm S. Suppose the maximum object length is y ($y < 0$), and the distance from the object side principal plane H to a document (object) 1 is a ($a < 0$), the conversion angle of inclination $\alpha 0$ of the principal ray having a maximum angle of view and incident on the lens system is expressed by the equation (1) below. Indicated at H' in the diagram is the image side principal plane.

$$\alpha 0 = -y/a (\alpha 0 < 0) \tag{1}$$

Figure 3:
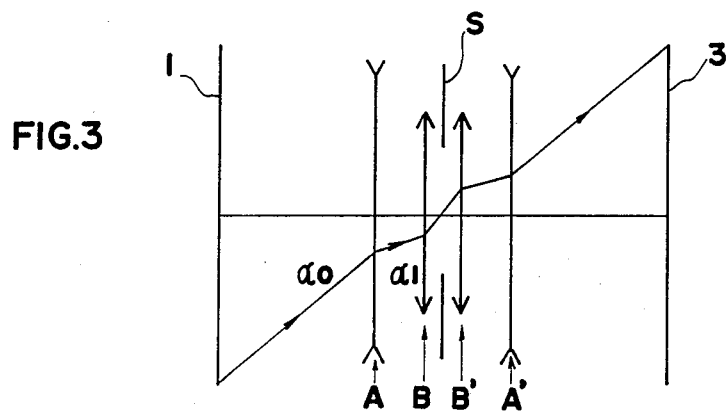
FIG. 3 is a diagram schematically showing the construction of wide angle lens systems according to the first to third embodiments.

With reference to FIG. 3, the wide angle lens systems of first to third embodiments to be described in detail below can be regarded as comprising, as arranged from the object side toward the image side, a negative lens unit A, positive lens unit B, diaphragm S, positive lens unit B' symmetrical with the lens unit B with respect to the diaphragm S, and negative lens unit A' symmetrical with the lens unit A. When the principal ray of maximum angle of view is paraxially traced as an incident ray, the conversion angle of inclination $\alpha$ of the ray incident on the lens unit B is expressed by the equation (2) given below. It is assumed that the height of incidence on the lens unit A is 1.

$$\alpha = \alpha 0 - \phi A (\alpha < 0) \tag{2}$$

wherein $\phi A$ is the refracting power (reciprocal of the focal length) of the negative lens unit A (A') ($\phi A < 0$). Since $\phi A < 0$, $$\alpha - \alpha 0 = -\phi A > 0 \tag{2'}$$

Thus, the absolute value of the conversion angle of inclination α of the ray incident on the positive lens unit B is reduced by the action of the negative lens unit A. Accordingly, the combined lens group of the positive lens units B and B' arranged symmetrically with each other with respect to the diaphragm S can be desired with a relatively small angle of view. Further since the object point and the image point will be at an increased distance from the positive lens unit B and the positive lens unit B', respectively, the conjugate distance L can be assumed to be great relative to the same object length y, hence a great advantage to the correction of aberrations.

FIRST EMBODIMENT

FIGS. 4, 6, 8, 10, 12 and 14 are diagrams respectively showing Examples 1 to 6 of wide angle lens systems according to the first embodiment. FIGS. 5, 7, 9, 11, 13 and 15 are diagrams showing the aberration curves of Examples 1 to 6, respectively.

The lens system of the first embodiment comprises, as arranged from the object side toward the image side, a first (negative) lens L1, second (positive) lens L2, third (negative) lens L3, fourth (positive) lens L4, diaphragm S, fifth (positive) lens L5, sixth (negative) lens L6, seventh (positive) lens L7 and eighth (negative) lens L8, i.e., eight lenses which are arranged symmetrically with respect to the diaphragm S. The eighth, seventh, sixth and fifth lenses are shaped symmetrically with the first, second, third and fourth lenses, respectively, with respect to the diaphragm S.

With the first embodiment, the first lens L1 and the eighth lens L8 are each an aspherical lens having at least one aspherical surface. Thus, the symmetrical lens surfaces of the first lens L1 and the eighth lens L8 are aspherical and in rotation symmetry with each other. As compared with the standard curvature, the aspherical surface is preferably so shaped that the refracting power increases in the negative direction with an increase in the distance from the optical axis.

With the first embodiment, therefore, the first lens L1 corresponds to the negative lens unit A, the unit of the second lens L2, third lens L3 and fourth lens L4 to the positive lens unit B, the unit of the fifth lens L5, sixth lens L6 and seventh lens L7 to the positive lens unit B', and the eighth lens L8 to the negative lens unit A'. Thus, to provide a wide angle of view, the first lens L1 and the eighth lens L8 serve as the respective negative lens units A and A' and are adapted to give a decreased angle of view to the positive lens units B and B'. The positive lens units B, B' of the first embodiment described are of the ortho-meta type as modified.

The lens system of the first embodiment has a very wide angle of view (about 86° in 2ω) and is yet so compact that it is about 0.38 in telescopic ratio (overall length of lens system/focal length of entire system). A technical problem encountered with such wide angle compact lens systems is the correction of off-axis astigmatic differences. To solve the technical problem with the first embodiment, aspherical lenses are used as the first lens L1 and the eighth lens L8 which are positioned at the largest distance from the diaphragm S and with which the position where off-axis rays pass varies greatly with the angle of view. Consequently, off-axis aberrations, especially astigmatic difference and curvature of field, are corrected satisfactorily. Especially in order to properly correct the image surface by decreasing Petzval's sum which determines the astigmatic difference, it is desired that the direction of deviation of the aspherical surface from the standard curvature be so defined that the refracting power increases in the negative direction with increasing distance from the optical axis.

It is further desired that the following conditional inequality (3) be satisfied by the radius of curvature r4 of the diaphragm side surface of the second lens L2 and the radius of curvature r5 of the object side of the third lens L3.

$$r4 > r5 \tag{3}$$

The inequality (3) is to be satisfied in order to shape the two lenses concentrically with the diaphragm S and to facilitate the correction of off-axis aberrations.

It is further desired that the focal length f1 of the first lens L1 and the focal length f of the entire lens system satisfy the conditional inequality (4) below.

$$-2.5f < f1 < -1.0f \tag{4}$$

The inequality (4) is to be satisfied to decrease the angle of view of incident rays on the positive lens unit B and to decrease the overall length of the lens system. If the focal length f1 is below the lower limit value of the inequality (4), the difference between the conversion angles of inclination α and α0 decreases, making it impossible to greatly decrease the angle of view for the positive lens unit B and therefore presenting difficulty in correcting off-axis aberrations. Beyond the upper limit value, the first lens L1 has too great a negative refracting power to compact the lens system.

When the first lens L1 and the eighth lens L8 having an aspherical surface of the largest outside diameter are to be prepared from synthetic resin by plastic molding, these lenses can be produced in large quantities at a greatly reduced cost.

Tables 1 to 6 show specific numerical values for Examples 1 to 6 shown in FIGS. 4, 6, 8, 10, 12 and 14, respectively.

Each of these tables, (a) shows numerical values for the lens surfaces concerned, i.e., radii of curvature, axial distances, refractive indexes along d line and Abbe numbers. The aspherical lens surface is identified as such by an asterisk attached to the radius of curvature thereof. Each table, (b) shows the aspherical coefficients of the aspherical surfaces in the example concerned. The aspherical coefficient Ai in the table is a coefficient of the function $x = f(y, z)$ representing the aspherical surface and obtained by plotting the optical axis as x-axis and plotting y-axis and z-axis of orthogonal coordinates in the plane of $x = 0$. When $y^2 + z^2 = \phi^2$, the function is expressed by the equation (5):

$$x = \frac{Co\phi^2}{1 + (1 - Co^2\phi^2)^{-\frac{1}{2}}} + \sum_{i=2}^{16} Ai\phi^2 \tag{5}$$

wherein Co is the reciprocal of the radius of curvature.

The first and eighth lenses are made of glass in Examples 1 to 4, or synthetic resin in Examples 5 and 6.

According to the first embodiment described above, a compact wide angle lens system can be realized which exhibits very excellent performance in projecting images each with a satisfactory quality in its entirety although having an extremely wide angle of view.

TABLE 1(a)

Figure 4:
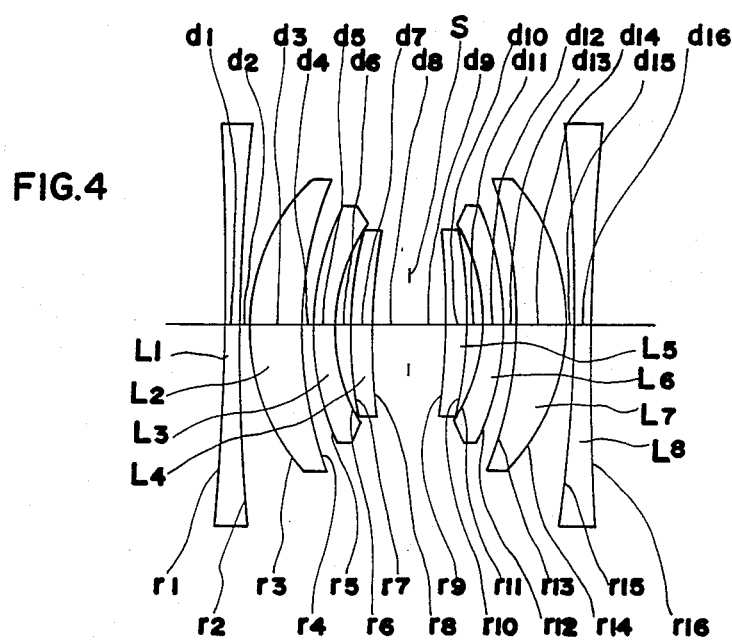
FIGS. 4, 6, 8, 10, 12 and 14 are diagrams respectively showing the constructions of Examples 1 to 6 included in the first embodiment.
Figure 5:
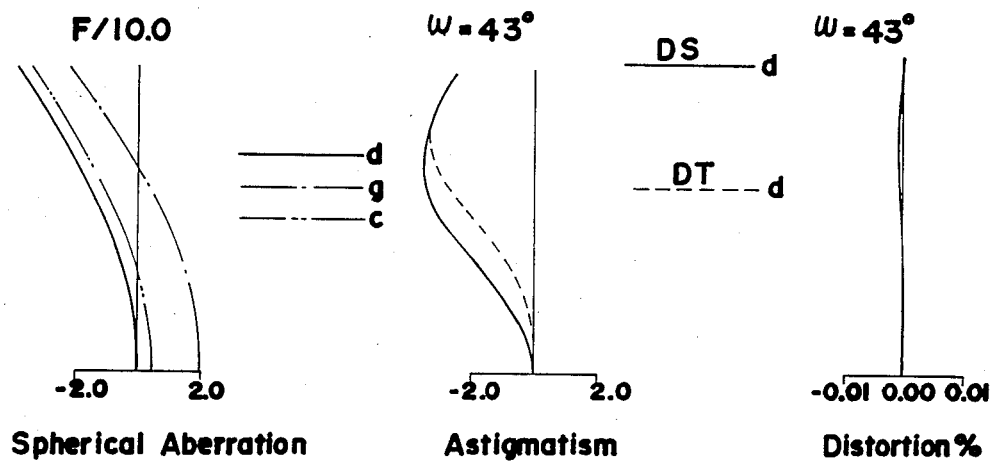
FIGS. 5, 7, 9, 11, 13 and 15 are diagrams respectively showing the aberration curves of Examples 1 to 6.

[Example 1; FIGS. 4 and 5]
f = 140.1  F No. = 10.0

| Radius of curvature | Axial distance | Refractive index (Nd) | Abbe number (νd) |
|---|---|---|---|
| $r_1^*$  −353.627 | | | |
| | $d_1$  2.260 | $N_1$  1.59551 | $\nu_1$  39.23 |
| $r_2^*$  267.305 | | | |
| | $d_2$  1.307 | | |
| $r_3$  30.696 | | | |
| | $d_3$  7.300 | $N_2$  1.76500 | $\nu_2$  46.25 |
| $r_4$  57.411 | | | |
| | $d_4$  1.963 | | |
| $r_5$  39.567 | | | |
| | $d_5$  2.404 | $N_3$  1.68300 | $\nu_3$  31.52 |
| $r_6$  23.036 | | | |
| | $d_6$  2.767 | | |
| $r_7$  60.748 | | | |
| | $d_7$  3.426 | $N_4$  1.71700 | $\nu_4$  47.86 |
| $r_8$  128.142 | | | |
| | $d_8$  5.241 | | |
| S  — | | | |
| | $d_9$  5.241 | | |
| $r_9$  −128.142 | | | |
| | $d_{10}$  3.426 | $N_5$  1.71700 | $\nu_5$  47.86 |
| $r_{10}$  −60.748 | | | |
| | $d_{11}$  2.767 | | |
| $r_{11}$  −23.036 | | | |
| | $d_{12}$  2.404 | $N_6$  1.68300 | $\nu_6$  31.52 |
| $r_{12}$  −39.567 | | | |
| | $d_{13}$  1.963 | | |
| $r_{13}$  −57.411 | | | |
| | $d_{14}$  7.300 | $N_7$  1.76500 | $\nu_7$  46.25 |
| $r_{14}$  −30.696 | | | |
| | $d_{15}$  1.307 | | |
| $r_{15}^*$  −267.305 | | | |
| | $d_{16}$  2.260 | $N_8$  1.59551 | $\nu_8$  39.23 |
| $r_{16}^*$  353.627 | | | |
| | $\Sigma d = 53.337$ | | |

TABLE 2(a)

Figure 6:
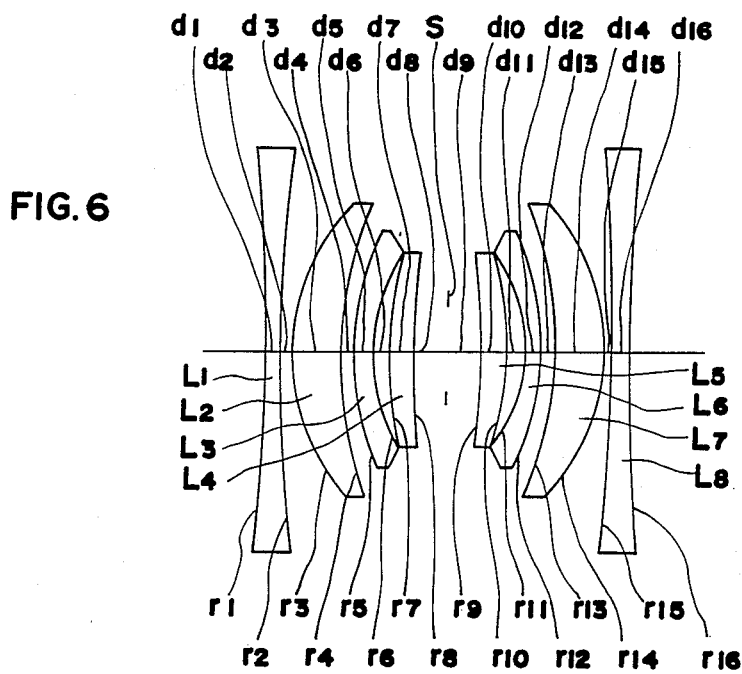
Figure 7:
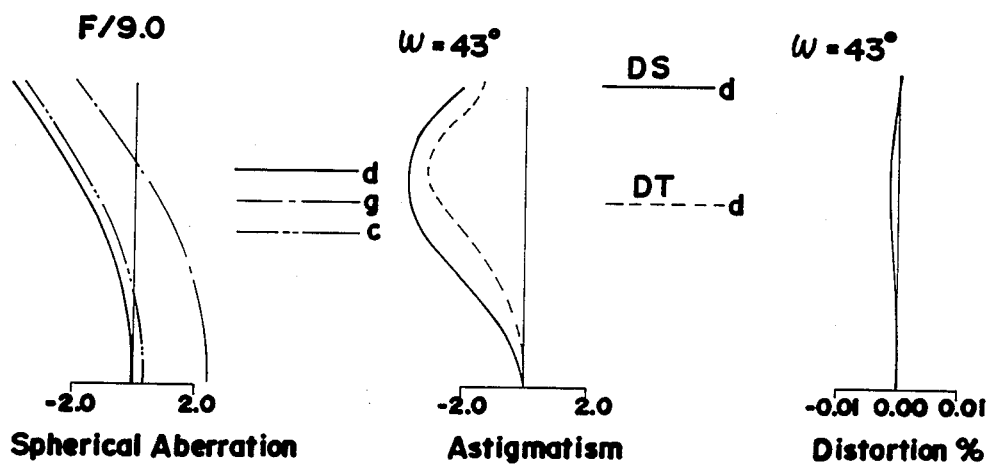

[Example 2; FIGS. 6 and 7]
f = 140.1  F No. = 9.0

| Radius of curvature | Axial distance | Refractive index (Nd) | Abbe number (νd) |
|---|---|---|---|
| $r_1^*$  −328.140 | | | |
| | $d_1$  2.337 | $N_1$  1.59551 | $\nu_1$  39.23 |
| $r_2^*$  268.643 | | | |
| | $d_2$  1.402 | | |
| $r_3$  30.670 | | | |
| | $d_3$  7.166 | $N_2$  1.76500 | $\nu_2$  46.25 |
| $r_4$  57.481 | | | |
| | $d_4$  1.960 | | |
| $r_5$  39.596 | | | |
| | $d_5$  2.325 | $N_3$  1.68300 | $\nu_3$  31.52 |
| $r_6$  23.039 | | | |
| | $d_6$  2.914 | | |
| $r_7$  60.356 | | | |
| | $d_7$  3.476 | $N_4$  1.71700 | $\nu_4$  47.86 |
| $r_8$  129.525 | | | |
| | $d_8$  4.910 | | |
| S  — | | | |
| $r_9$  −129.525 | | | |
| | $d_{10}$  3.476 | $N_5$  1.71700 | $\nu_5$  47.86 |
| $r_{10}$  −60.356 | | | |
| | $d_{11}$  2.914 | | |
| $r_{11}$  −23.039 | | | |
| | $d_{12}$  2.325 | $N_6$  1.68300 | $\nu_6$  31.52 |
| $r_{12}$  −39.596 | | | |
| | $d_{13}$  1.960 | | |
| $r_{13}$  −57.481 | | | |
| | $d_{14}$  7.166 | $N_7$  1.76500 | $\nu_7$  46.25 |
| $r_{14}$  −30.670 | | | |
| | $d_{15}$  1.402 | | |
| $r_{15}^*$  −268.643 | | | |
| | $d_{16}$  2.337 | $N_8$  1.59551 | $\nu_8$  39.23 |
| $r_{16}^*$  328.140 | | | |
| | $\Sigma d = 52.979$ | | |

TABLE 1(b)

[Example 1]

Aspherical coefficient $r_1$:
- $A_2 = 0.0$
- $A_3 = 0.0$
- $A_4 = -0.31552 \times 10^{-7}$
- $A_5 = 0.0$
- $A_6 = -0.73194 \times 10^{-11}$
- $A_7 = 0.0$
- $A_8 = -0.74588 \times 10^{-14}$
- $A_9 = 0.0$
- $A_{10} = 0.93016 \times 10^{-16}$
- $A_{11} = 0.0$
- $A_{12} = 0.0$
- $A_{13} = 0.0$
- $A_{14} = 0.0$
- $A_{15} = 0.0$
- $A_{16} = 0.0$ $r_2$:
- $A_2 = 0.0$
- $A_3 = 0.0$
- $A_4 = 0.61558 \times 10^{-18}$
- $A_5 = 0.0$
- $A_6 = 0.32911 \times 10^{-18}$
- $A_7 = 0.0$
- $A_8 = 0.46912 \times 10^{-19}$
- $A_9 = 0.0$
- $A_{10} = 0.42997 \times 10^{-16}$
- $A_{11} = 0.0$
- $A_{12} = 0.16241 \times 10^{-18}$
- $A_{13} = 0.0$
- $A_{14} = 0.0$
- $A_{15} = 0.0$
- $A_{16} = 0.0$ $r_{15}$:
- $A_2 = 0.0$
- $A_3 = 0.0$
- $A_4 = -0.61558 \times 10^{-18}$
- $A_5 = 0.0$
- $A_6 = -0.32911 \times 10^{-18}$
- $A_7 = 0.0$
- $A_8 = -0.46912 \times 10^{-19}$
- $A_9 = 0.0$
- $A_{10} = -0.42997 \times 10^{-16}$
- $A_{11} = 0.0$
- $A_{12} = -0.16241 \times 10^{-18}$
- $A_{13} = 0.0$
- $A_{14} = 0.0$
- $A_{15} = 0.0$
- $A_{16} = 0.0$ $r_{16}$:
- $A_2 = 0.0$
- $A_3 = 0.0$
- $A_4 = 0.31552 \times 10^{-7}$
- $A_5 = 0.0$
- $A_6 = 0.73194 \times 10^{-11}$
- $A_7 = 0.0$
- $A_8 = 0.74588 \times 10^{-14}$
- $A_9 = 0.0$
- $A_{10} = -0.93016 \times 10^{-16}$
- $A_{11} = 0.0$
- $A_{12} = 0.0$
- $A_{13} = 0.0$
- $A_{14} = 0.0$
- $A_{15} = 0.0$
- $A_{16} = 0.0$

TABLE 2(b)

[Example 2]

Aspherical coefficient $r_1$:
- $A_2 = 0.0$
- $A_3 = 0.0$
- $A_4 = -0.37343 \times 10^{-7}$
- $A_5 = 0.0$
- $A_6 = -0.56912 \times 10^{-11}$
- $A_7 = 0.0$
- $A_8 = -0.87898 \times 10^{-14}$
- $A_9 = 0.0$
- $A_{10} = 0.10700 \times 10^{-15}$
- $A_{11} = 0.0$
- $A_{12} = 0.0$
- $A_{13} = 0.0$

TABLE 2(b)-continued

[Example 2]

Aspherical coefficient

|  |  |  |  |  |  |  |  |
|---|---|---|---|---|---|---|---|
|  | $A_{14} =$ | 0.0 | $A_{15} =$ | 0.0 | $A_{16} =$ | 0.0 |  |
| $r_2$: | $A_2 =$ | 0.0 | $A_3 =$ | 0.0 | $A_4 =$ | $0.15866 \times 10^{-17}$ |  |
|  | $A_5 =$ | 0.0 | $A_6 =$ | $0.47804 \times 10^{-18}$ | $A_7 =$ | 0.0 |  |
|  | $A_8 =$ | $0.65249 \times 10^{-19}$ | $A_9 =$ | 0.0 | $A_{10} =$ | $0.46250 \times 10^{-16}$ |  |
|  | $A_{11} =$ | 0.0 | $A_{12} =$ | $0.20345 \times 10^{-18}$ | $A_{13} =$ | 0.0 |  |
|  | $A_{14} =$ | 0.0 | $A_{15} =$ | 0.0 | $A_{16} =$ | 0.0 |  |
| $r_{15}$: | $A_2 =$ | 0.0 | $A_3 =$ | 0.0 | $A_4 =$ | $-0.15866 \times 10^{-17}$ |  |
|  | $A_5 =$ | 0.0 | $A_6 =$ | $-0.47804 \times 10^{-18}$ | $A_7 =$ | 0.0 |  |
|  | $A_8 =$ | $-0.65249 \times 10^{-19}$ | $A_9 =$ | 0.0 | $A_{10} =$ | $-0.46250 \times 10^{-16}$ |  |
|  | $A_{11} =$ | 0.0 | $A_{12} =$ | $-0.20345 \times 10^{-18}$ | $A_{13} =$ | 0.0 |  |
|  | $A_{14} =$ | 0.0 | $A_{15} =$ | 0.0 | $A_{16} =$ | 0.0 |  |
| $r_{16}$: | $A_2 =$ | 0.0 | $A_3 =$ | 0.0 | $A_4 =$ | $0.37343 \times 10^{-7}$ |  |
|  | $A_5 =$ | 0.0 | $A_6 =$ | $0.56912 \times 10^{-11}$ | $A_7 =$ | 0.0 |  |
|  | $A_8 =$ | $0.87898 \times 10^{-14}$ | $A_9 =$ | 0.0 | $A_{10} =$ | $-0.10700 \times 10^{-15}$ |  |
|  | $A_{11} =$ | 0.0 | $A_{12} =$ | 0.0 | $A_{13} =$ | 0.0 |  |
|  | $A_{14} =$ | 0.0 | $A_{15} =$ | 0.0 | $A_{16} =$ | 0.0 |  |

TABLE 3(a)

Figure 8:
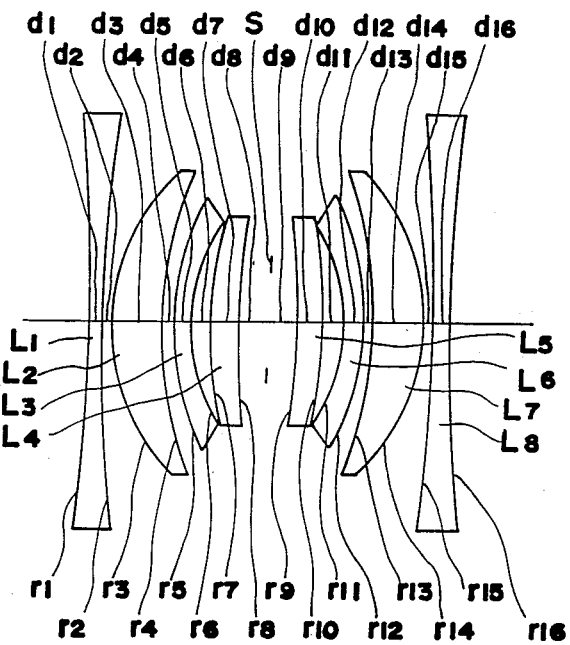
Figure 9:
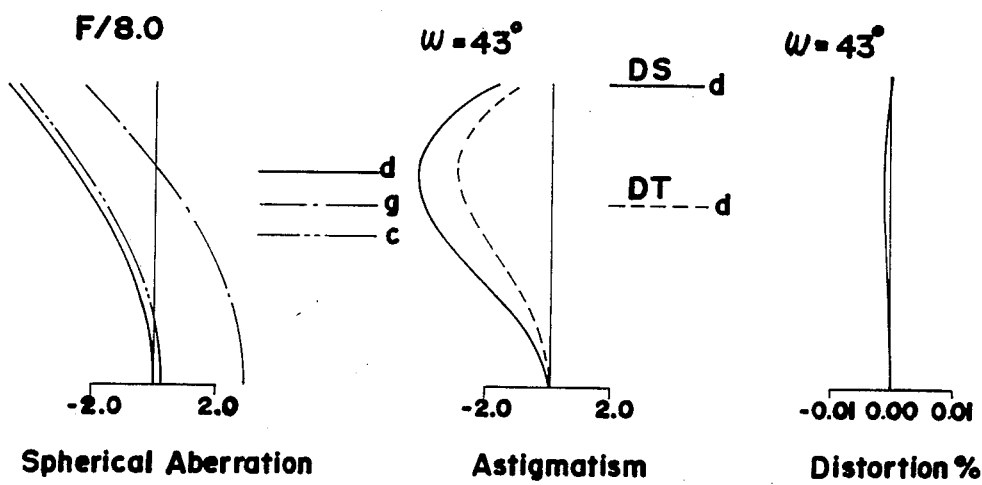

[Example 3; FIGS. 8 and 9]
$f = 140.1$   F No. $= 8.0$

| | Radius of curvature | | Axial distance | Refractive index (Nd) | | Abbe number ($\nu d$) |
|---|---|---|---|---|---|---|
| $r_1^*$ | $-289.649$ | | | | | |
| | | $d_1$ | 2.328 | $N_1$   1.59551 | $\nu_1$ | 39.23 |
| $r_2^*$ | 269.528 | | | | | |
| | | $d_2$ | 1.394 | | | |
| $r_3$ | 30.647 | | | | | |
| | | $d_3$ | 7.084 | $N_2$   1.76500 | $\nu_2$ | 46.25 |
| $r_4$ | 57.742 | | | | | |
| | | $d_4$ | 1.996 | | | |
| $r_5$ | 39.502 | | | | | |
| | | $d_5$ | 2.131 | $N_3$   1.68300 | $\nu_3$ | 31.52 |
| $r_6$ | 23.066 | | | | | |
| | | $d_6$ | 3.101 | | | |
| $r_7$ | 59.905 | | | | | |
| | | $d_7$ | 4.336 | $N_4$   1.71700 | $\nu_4$ | 47.86 |
| $r_8$ | 131.097 | | | | | |
| | | $d_8$ | 4.207 | | | |
| S | — | | | | | |
| | | $d_9$ | 4.207 | | | |
| $r_9$ | $-131.097$ | | | | | |
| | | $d_{10}$ | 4.336 | $N_5$   1.71700 | $\nu_5$ | 47.86 |
| $r_{10}$ | $-59.905$ | | | | | |
| | | $d_{11}$ | 3.101 | | | |
| $r_{11}$ | $-23.066$ | | | | | |
| | | $d_{12}$ | 2.131 | $N_6$   1.68300 | $\nu_6$ | 31.52 |
| $r_{12}$ | $-39.502$ | | | | | |
| | | $d_{13}$ | 1.996 | | | |
| $r_{13}$ | $-57.742$ | | | | | |
| | | $d_{14}$ | 7.084 | $N_7$   1.76500 | $\nu_7$ | 46.25 |
| $r_{14}$ | $-30.647$ | | | | | |
| | | $d_{15}$ | 1.394 | | | |
| $r_{15}^*$ | $-269.528$ | | | | | |
| | | $d_{16}$ | 2.328 | $N_8$   1.59551 | $\nu_8$ | 39.23 |
| $r_{16}^*$ | 289.649 | | | | | |
| | | $\Sigma d =$ | 53.153 | | | |

TABLE 3(b)

[Example 3]

Aspherical coefficient

| | | | | | | | |
|---|---|---|---|---|---|---|---|
| $r_1$: | $A_2 =$ | 0.0 | $A_3 =$ | 0.0 | $A_4 =$ | $-0.43312 \times 10^{-7}$ | |
| | $A_5 =$ | 0.0 | $A_6 =$ | $0.40841 \times 10^{-11}$ | $A_7 =$ | 0.0 | |
| | $A_8 =$ | $0.79250 \times 10^{-15}$ | $A_9 =$ | 0.0 | $A_{10} =$ | $0.11093 \times 10^{-15}$ | |
| | $A_{11} =$ | 0.0 | $A_{12} =$ | 0.0 | $A_{13} =$ | 0.0 | |
| | $A_{14} =$ | 0.0 | $A_{15} =$ | 0.0 | $A_{16} =$ | 0.0 | |
| $r_2$: | $A_2 =$ | 0.0 | $A_3 =$ | 0.0 | $A_4 =$ | $0.12169 \times 10^{-17}$ | |
| | $A_5 =$ | 0.0 | $A_6 =$ | $0.49885 \times 10^{-18}$ | $A_7 =$ | 0.0 | |
| | $A_8 =$ | $0.70215 \times 10^{-19}$ | $A_9 =$ | 0.0 | $A_{10} =$ | $0.55175 \times 10^{-16}$ | |
| | $A_{11} =$ | 0.0 | $A_{12} =$ | $0.25278 \times 10^{-18}$ | $A_{13} =$ | 0.0 | |
| | $A_{14} =$ | 0.0 | $A_{15} =$ | 0.0 | $A_{16} =$ | 0.0 | |
| $r_{15}$: | $A_2 =$ | 0.0 | $A_3 =$ | 0.0 | $A_4 =$ | $-0.12169 \times 10^{-17}$ | |
| | $A_5 =$ | 0.0 | $A_6 =$ | $-0.49885 \times 10^{-18}$ | $A_7 =$ | 0.0 | |
| | $A_8 =$ | $-0.70215 \times 10^{-19}$ | $A_9 =$ | 0.0 | $A_{10} =$ | $-0.55175 \times 10^{-16}$ | |
| | $A_{11} =$ | 0.0 | $A_{12} =$ | $-0.25278 \times 10^{-18}$ | $A_{13} =$ | 0.0 | |
| | $A_{14} =$ | 0.0 | $A_{15} =$ | 0.0 | $A_{16} =$ | 0.0 | |
| $r_{16}$: | $A_2 =$ | 0.0 | $A_3 =$ | 0.0 | $A_4 =$ | $0.43312 \times 10^{-7}$ | |
| | $A_5 =$ | 0.0 | $A_6 =$ | $-0.40841 \times 10^{-11}$ | $A_7 =$ | 0.0 | |
| | $A_8 =$ | $-0.79250 \times 10^{-15}$ | $A_9 =$ | 0.0 | $A_{10} =$ | $-0.11093 \times 10^{-15}$ | |
| | $A_{11} =$ | 0.0 | $A_{12} =$ | 0.0 | $A_{13} =$ | 0.0 | |
| | $A_{14} =$ | 0.0 | $A_{15} =$ | 0.0 | $A_{16} =$ | 0.0 | |

TABLE 4(a)

Figure 10:
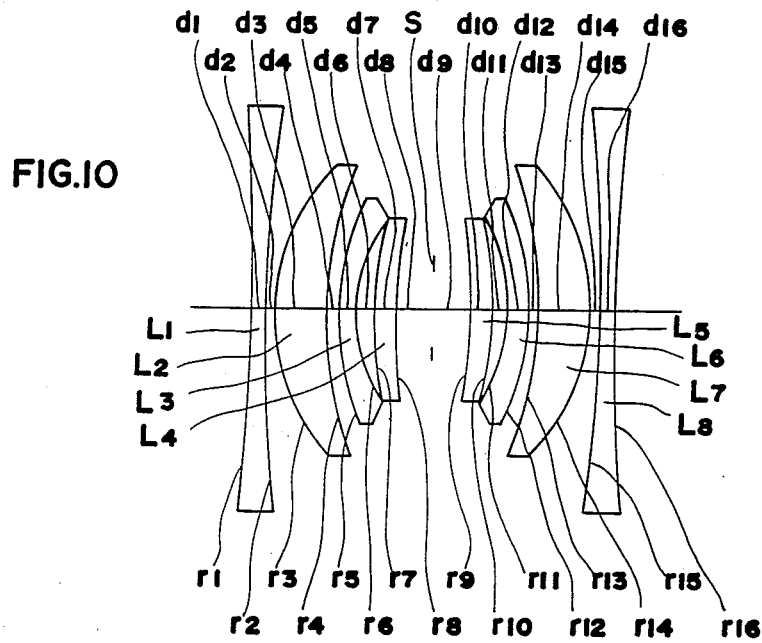
Figure 11:
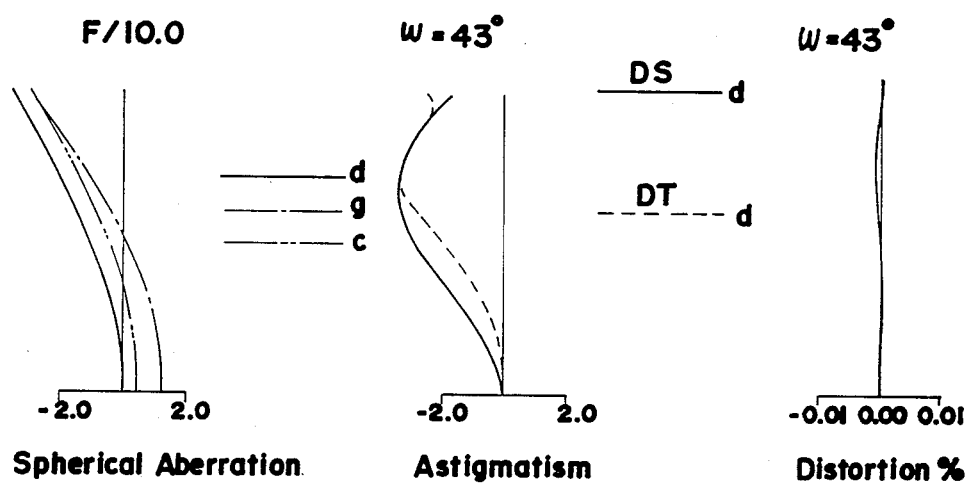

[Example 4; FIGS. 10 and 11]
$f = 140.1$   F No. $= 10.0$

| | Radius of curvature | | Axial distance | Refractive index (Nd) | | Abbe number ($\nu d$) |
|---|---|---|---|---|---|---|
| $r_1^*$ | $-353.633$ | | | | | |
| | | $d_1$ | 2.260 | $N_1$   1.58400 | $\nu_1$ | 31.00 |
| $r_2^*$ | 267.340 | | | | | |
| | | $d_2$ | 1.307 | | | |
| $r_3$ | 30.695 | | | | | |
| | | $d_3$ | 7.300 | $N_2$   1.76200 | $\nu_2$ | 40.36 |
| $r_4$ | 57.413 | | | | | |
| | | $d_4$ | 1.963 | | | |
| $r_5$ | 39.566 | | | | | |
| | | $d_5$ | 2.404 | $N_3$   1.68300 | $\nu_3$ | 31.52 |
| $r_6$ | 23.036 | | | | | |
| | | $d_6$ | 2.767 | | | |
| $r_7$ | 60.747 | | | | | |

TABLE 4(a)-continued

[Example 4; FIGS. 10 and 11]
f = 140.1  F No. = 10.0

| | Radius of curvature | Axial distance | | Refractive index (Nd) | | Abbe number ($\nu d$) | |
|---|---|---|---|---|---|---|---|
| | | $d_7$ | 3.426 | $N_4$ | 1.72000 | $\nu_4$ | 54.71 |
| $r_8$ | 126.835 | | | | | | |
| | | $d_8$ | 5.241 | | | | |
| S | — | | | | | | |
| | | $d_9$ | 5.241 | | | | |
| $r_9$ | −126.835 | | | | | | |
| | | $d_{10}$ | 3.426 | $N_5$ | 1.72000 | $\nu_5$ | 54.71 |
| $r_{10}$ | −60.747 | | | | | | |
| | | $d_{11}$ | 2.767 | | | | |
| $r_{11}$ | −23.036 | | | | | | |
| | | $d_{12}$ | 2.404 | $N_6$ | 1.68300 | $\nu_6$ | 31.52 |
| $r_{12}$ | −39.566 | | | | | | |
| | | $d_{13}$ | 1.963 | | | | |
| $r_{13}$ | −57.413 | | | | | | |
| | | $d_{14}$ | 7.300 | $N_7$ | 1.76200 | $\nu_7$ | 40.36 |
| $r_{14}$ | −30.695 | | | | | | |
| | | $d_{15}$ | 1.307 | | | | |
| $r_{15}^*$ | −267.340 | | | | | | |
| | | $d_{16}$ | 2.260 | $N_8$ | 1.58400 | $\nu_8$ | 31.00 |
| $r_{16}^*$ | 353.633 | | | | | | |
| | | $\Sigma d = 53.337$ | | | | | |

TABLE 4(b)

[Example 4]

Aspherical coefficient $r_1$:
$A_2 = 0.0$   $A_3 = 0.0$   $A_4 = -0.31552 \times 10^{-7}$
$A_5 = 0.0$   $A_6 = -0.73194 \times 10^{-11}$   $A_7 = 0.0$
$A_8 = -0.74588 \times 10^{-14}$   $A_9 = 0.0$   $A_{10} = 0.93016 \times 10^{-16}$
$A_{11} = 0.0$   $A_{12} = 0.0$   $A_{13} = 0.0$
$A_{14} = 0.0$   $A_{15} = 0.0$   $A_{16} = 0.0$ $r_2$:
$A_2 = 0.0$   $A_3 = 0.0$   $A_4 = 0.73080 \times 10^{-18}$
$A_5 = 0.0$   $A_6 = 0.34386 \times 10^{-18}$   $A_7 = 0.0$
$A_8 = 0.48860 \times 10^{-19}$   $A_9 = 0.0$   $A_{10} = 0.42997 \times 10^{-16}$
$A_{11} = 0.0$   $A_{12} = 0.16241 \times 10^{-18}$   $A_{13} = 0.0$
$A_{14} = 0.0$   $A_{15} = 0.0$   $A_{16} = 0.0$ $r_{15}$:
$A_2 = 0.0$   $A_3 = 0.0$   $A_4 = -0.73080 \times 10^{-18}$
$A_5 = 0.0$   $A_6 = -0.34386 \times 10^{-18}$   $A_7 = 0.0$
$A_8 = -0.48860 \times 10^{-19}$   $A_9 = 0.0$   $A_{10} = -0.42997 \times 10^{-16}$
$A_{11} = 0.0$   $A_{12} = -0.16241 \times 10^{-18}$   $A_{13} = 0.0$
$A_{14} = 0.0$   $A_{15} = 0.0$   $A_{16} = 0.0$ $r_{16}$:
$A_2 = 0.0$   $A_3 = 0.0$   $A_4 = 0.31552 \times 10^{-7}$
$A_5 = 0.0$   $A_6 = 0.73194 \times 10^{-11}$   $A_7 = 0.0$
$A_8 = 0.74588 \times 10^{-14}$   $A_9 = 0.0$   $A_{10} = -0.93016 \times 10^{-16}$
$A_{11} = 0.0$   $A_{12} = 0.0$   $A_{13} = 0.0$
$A_{14} = 0.0$   $A_{15} = 0.0$   $A_{16} = 0.0$

TABLE 5(a)

Figure 12:
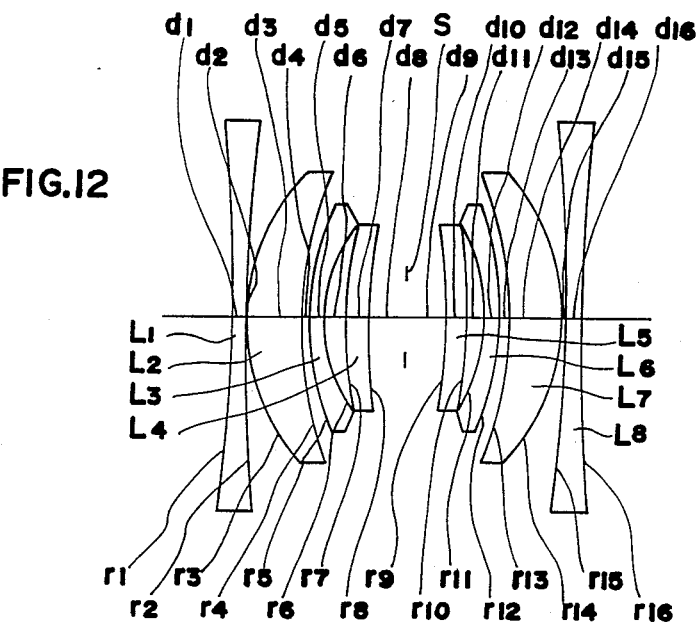
Figure 13:
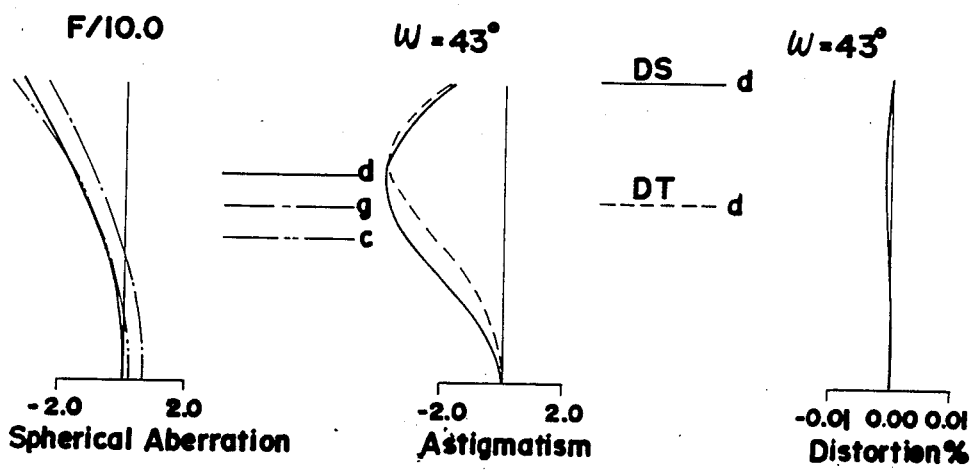

[Example 5; FIGS. 12 and 13]
f = 140.1  F No. = 10.0

| | Radius of curvature | Axial distance | | Refractive index (Nd) | | Abbe number ($\nu d$) | |
|---|---|---|---|---|---|---|---|
| $r_1^*$ | −375.697 | | | | | | |
| | | $d_1$ | 2.500 | $N_1$ | 1.58400 | $\nu_1$ | 31.00 |
| $r_2^*$ | 295.734 | | | | | | |
| | | $d_2$ | 0.600 | | | | |
| $r_3$ | 30.758 | | | | | | |
| | | $d_3$ | 7.338 | $N_2$ | 1.76200 | $\nu_2$ | 40.36 |
| $r_4$ | 55.308 | | | | | | |
| | | $d_4$ | 1.300 | | | | |
| $r_5$ | 39.296 | | | | | | |
| | | $d_5$ | 2.456 | $N_3$ | 1.68300 | $\nu_3$ | 31.52 |
| $r_6$ | 23.329 | | | | | | |
| | | $d_6$ | 2.765 | | | | |
| $r_7$ | 66.366 | | | | | | |
| | | $d_7$ | 3.426 | $N_4$ | 1.72000 | $\nu_4$ | 54.71 |
| $r_8$ | 146.950 | | | | | | |
| | | $d_8$ | 5.268 | | | | |
| S | — | | | | | | |
| | | $d_9$ | 5.268 | | | | |
| $r_9$ | −146.950 | | | | | | |
| | | $d_{10}$ | 3.426 | $N_5$ | 1.72000 | $\nu_5$ | 54.71 |
| $r_{10}$ | −66.366 | | | | | | |
| | | $d_{11}$ | 2.765 | | | | |
| $r_{11}$ | −23.329 | | | | | | |
| | | $d_{12}$ | 2.456 | $N_6$ | 1.68300 | $\nu_6$ | 31.52 |
| $r_{12}$ | −39.296 | | | | | | |
| | | $d_{13}$ | 1.300 | | | | |
| $r_{13}$ | −55.308 | | | | | | |
| | | $d_{14}$ | 7.338 | $N_7$ | 1.76200 | $\nu_7$ | 40.36 |
| $r_{14}$ | −30.758 | | | | | | |
| | | $d_{15}$ | 0.600 | | | | |
| $r_{15}^*$ | −295.734 | | | | | | |
| | | $d_{16}$ | 2.500 | $N_8$ | 1.58400 | $\nu_8$ | 31.00 |
| $r_{16}^*$ | 375.697 | | | | | | |
| | | $\Sigma d = 51.306$ | | | | | |

TABLE 5(b)

[Example 5]

Aspherical coefficient $r_1$:
$A_2 = 0.0$   $A_3 = 0.0$   $A_4 = -0.31643 \times 10^{-7}$
$A_5 = 0.0$   $A_6 = -0.70937 \times 10^{-11}$   $A_7 = 0.0$
$A_8 = -0.96721 \times 10^{-14}$   $A_9 = 0.0$   $A_{10} = 0.10735 \times 10^{-15}$
$A_{11} = 0.0$   $A_{12} = 0.0$   $A_{13} = 0.0$
$A_{14} = 0.0$   $A_{15} = 0.0$   $A_{16} = 0.0$ $r_2$:
$A_2 = 0.0$   $A_3 = 0.0$   $A_4 = 0.65283 \times 10^{-18}$
$A_5 = 0.0$   $A_6 = 0.29430 \times 10^{-18}$   $A_7 = 0.0$
$A_8 = 0.41994 \times 10^{-19}$   $A_9 = 0.0$   $A_{10} = 0.44220 \times 10^{-16}$
$A_{11} = 0.0$   $A_{12} = 0.20208 \times 10^{-18}$   $A_{13} = 0.0$
$A_{14} = 0.0$   $A_{15} = 0.0$   $A_{16} = 0.0$ $r_{15}$:
$A_2 = 0.0$   $A_3 = 0.0$   $A_4 = -0.65283 \times 10^{-18}$
$A_5 = 0.0$   $A_6 = -0.29430 \times 10^{-18}$   $A_7 = 0.0$
$A_8 = -0.41994 \times 10^{-19}$   $A_9 = 0.0$   $A_{10} = -0.44220 \times 10^{-16}$ TABLE 5(b)-continued

[Example 5]

Aspherical coefficient

|  |  |  |  |  |  |  |
|---|---|---|---|---|---|---|
|  | $A_{11} =$ | 0.0 | $A_{12} =$ | $-0.20208 \times 10^{-18}$ | $A_{13} =$ | 0.0 |
|  | $A_{14} =$ | 0.0 | $A_{15} =$ | 0.0 | $A_{16} =$ | 0.0 |
| $r_{16}$: | $A_2 =$ | 0.0 | $A_3 =$ | 0.0 | $A_4 =$ | $0.31643 \times 10^{-7}$ |
|  | $A_5 =$ | 0.0 | $A_6 =$ | $0.70937 \times 10^{-11}$ | $A_7 =$ | 0.0 |
|  | $A_8 =$ | $0.96721 \times 10^{-14}$ | $A_9 =$ | 0.0 | $A_{10} =$ | $-0.10735 \times 10^{-15}$ |
|  | $A_{11} =$ | 0.0 | $A_{12} =$ | 0.0 | $A_{13} =$ | 0.0 |
|  | $A_{14} =$ | 0.0 | $A_{15} =$ | 0.0 | $A_{16} =$ | 0.0 |

TABLE 6 (a)

Figure 14:
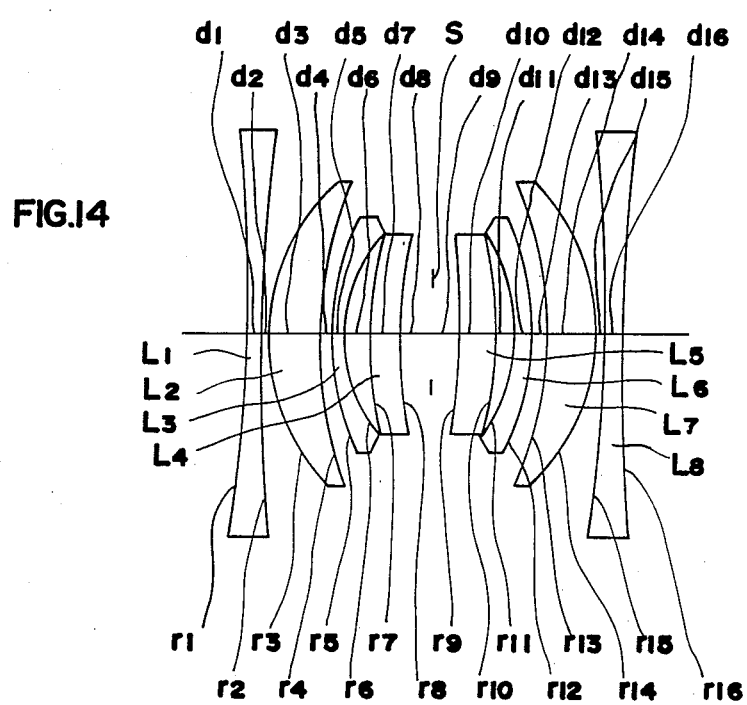
Figure 15:
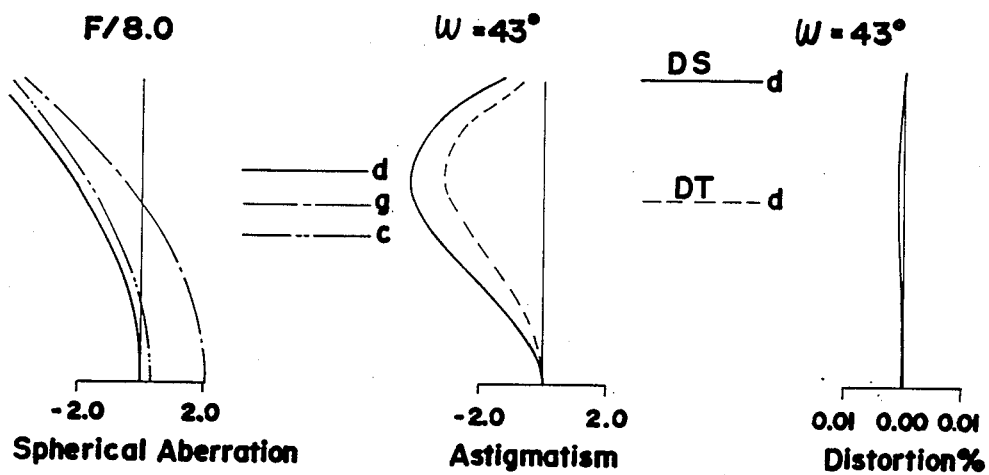

[Example 6; FIGS. 14 and 15]

$f = 140.1 \quad$ F No. $= 8.0$

| | Radius of curvature | | Axial distance | | Refractive index (Nd) | | Abbe number ($\nu$d) |
|---|---|---|---|---|---|---|---|
| $r_1^*$ | $-312.646$ | | | | | | |
| | | $d_1$ | 2.186 | $N_1$ | 1.58400 | $\nu_1$ | 31.00 |
| $r_2^*$ | 261.032 | | | | | | |
| | | $d_2$ | 1.285 | | | | |
| $r_3$ | 30.741 | | | | | | |
| | | $d_3$ | 7.190 | $N_2$ | 1.76200 | $\nu_2$ | 40.36 |
| $r_4$ | 58.754 | | | | | | |
| | | $d_4$ | 2.213 | | | | |
| $r_5$ | 39.344 | | | | | | |
| | | $d_5$ | 2.014 | $N_3$ | 1.68300 | $\nu_3$ | 31.52 |
| $r_6$ | 23.101 | | | | | | |
| | | $d_6$ | 3.248 | | | | |
| $r_7$ | 61.378 | | | | | | |
| | | $d_7$ | 5.282 | $N_4$ | 1.72000 | $\nu_4$ | 54.71 |
| $r_8$ | 128.474 | | | | | | |
| | | $d_8$ | 3.902 | | | | |
| S | — | | | | | | |
| | | $d_9$ | 3.902 | | | | |
| $r_9$ | $-128.474$ | | | | | | |
| | | $d_{10}$ | 5.282 | $N_5$ | 1.72000 | $\nu_5$ | 54.71 |
| $r_{10}$ | $-61.378$ | | | | | | |
| | | $d_{11}$ | 3.248 | | | | |
| $r_{11}$ | $-23.101$ | | | | | | |
| | | $d_{12}$ | 2.014 | $N_6$ | 1.68300 | $\nu_6$ | 31.52 |
| $r_{12}$ | $-39.344$ | | | | | | |
| | | $d_{13}$ | 2.213 | | | | |
| $r_{13}$ | $-58.754$ | | | | | | |
| | | $d_{14}$ | 7.190 | $N_7$ | 1.76200 | $\nu_7$ | 40.36 |
| $r_{14}$ | $-30.741$ | | | | | | |
| | | $d_{15}$ | 1.285 | | | | |
| $r_{15}^*$ | $-261.032$ | | | | | | |
| | | $d_{16}$ | 2.186 | $N_8$ | 1.58400 | $\nu_8$ | 31.00 |
| $r_{16}^*$ | 312.646 | | | | | | |

$\Sigma d = 54.642$

TABLE 6 (b)

[Example 6]

Aspherical coefficient

| | | | |
|---|---|---|---|
| $r_1$: | $A_2 = 0.0$ | $A_3 = 0.0$ | $A_4 = -0.85055 \times 10^{-7}$ |
| | $A_5 = 0.0$ | $A_6 = 0.39236 \times 10^{-10}$ | $A_7 = 0.0$ |
| | $A_8 = -0.29988 \times 10^{-13}$ | $A_9 = 0.0$ | $A_{10} = 0.11059 \times 10^{-15}$ |
| | $A_{11} = 0.0$ | $A_{12} = 0.0$ | $A_{13} = 0.0$ |
| | $A_{14} = 0.0$ | $A_{15} = 0.0$ | $A_{16} = 0.0$ |
| $r_2$: | $A_2 = 0.0$ | $A_3 = 0.0$ | $A_4 = 0.67740 \times 10^{-18}$ |
| | $A_5 = 0.0$ | $A_6 = 0.33808 \times 10^{-18}$ | $A_7 = 0.0$ |
| | $A_8 = 0.48368 \times 10^{-19}$ | $A_9 = 0.0$ | $A_{10} = 0.41627 \times 10^{-16}$ |
| | $A_{11} = 0.0$ | $A_{12} = 0.21617 \times 10^{-18}$ | $A_{13} = 0.0$ |
| | $A_{14} = 0.0$ | $A_{15} = 0.0$ | $A_{16} = 0.0$ |
| $r_{15}$: | $A_2 = 0.0$ | $A_3 = 0.0$ | $A_4 = -0.67740 \times 10^{-18}$ |
| | $A_5 = 0.0$ | $A_6 = -0.33808 \times 10^{-18}$ | $A_7 = 0.0$ |
| | $A_8 = -0.48368 \times 10^{-19}$ | $A_9 = 0.0$ | $A_{10} = -0.41627 \times 10^{-16}$ |
| | $A_{11} = 0.0$ | $A_{12} = -0.21617 \times 10^{-18}$ | $A_{13} = 0.0$ |
| | $A_{14} = 0.0$ | $A_{15} = 0.0$ | $A_{16} = 0.0$ |
| $r_{16}$: | $A_2 = 0.0$ | $A_3 = 0.0$ | $A_4 = 0.85055 \times 10^{-7}$ |
| | $A_5 = 0.0$ | $A_6 = -0.39236 \times 10^{-10}$ | $A_7 = 0.0$ |
| | $A_8 = 0.29988 \times 10^{-13}$ | $A_9 = 0.0$ | $A_{10} = -0.11059 \times 10^{-15}$ |
| | $A_{11} = 0.0$ | $A_{12} = 0.0$ | $A_{13} = 0.0$ |
| | $A_{14} = 0.0$ | $A_{15} = 0.0$ | $A_{16} = 0.0$ |

SECOND EMBODIMENT

FIGS. 16, 18, 20 and 22 are diagrams respectively showing Examples 7 to 10 of wide angle lens systems according to the second embodiment. FIGS. 17, 19, 21 and 23 are diagrams showing the aberration curves of Examples 7 to 10, respectively.

The lens system of the second embodiment comprises, as arranged from the object side toward the image side, a first lens unit U1 in the form of a negative first lens L11, a second lens unit U2 composed of a positive meniscus second lens L12 having a convex surface directed toward the object side and a negative meniscus third lens L13 having a concave surface directed toward the image side, a third lens unit U3 in the form of a positive meniscus fourth lens L14 having a convex surface directed toward the object side, a diaphragm S, a fourth lens unit U4 symmetrical with the third lens unit U3 with respect to the diaphragm S and in the form of a positive meniscus fifth lens L15 with a convex surface directed toward the image side, a fifth lens unit U5 symmetrical with the second lens unit U2 with respect to the diaphragm S and composed of a negative meniscus sixth lens L16 with a concave surface directed toward the object side and a positive meniscus seventh lens L17 with a convex surface directed toward the image side, and a sixth lens unit U6 symmetrical with the first lens unit U1 with respect to the diaphragm S and in the form of a negative eighth lens L18. Thus, the lens system comprises eight lenses in six groups as arranged symmetrically with respect to the diaphragm S. The eighth, seventh, sixth and fifth lenses are shaped symmetrically with the first, second, third and fourth lenses, respectively, with respect to the diaphragm S.

In the second embodiment as in the first, therefore, the first lens L11 corresponds to the negative lens unit A, the unit of the second lens L12, third lens L13 and fourth lens L14 to the positive lens unit B, the unit of the fifth lens L15, sixth lens L16 and seventh lens L17 to the positive lens unit B', and the eighth lens L18 to the negative lens unit A'. Thus, to provide a wide angle of view, the first lens L11 and the eighth lens L18 serve as the respective negative lens units A and A' and are adapted to give a decreased angle of view to the positive lens units B and B' As in the case of the first embodiment, the positive lens units B, B' of the second embodiment are also the ortho-meta type as modified.

Further in the case of the lens system of the second embodiment, the following conditional inequality (6) is satisfied by the radius of curvature r4 of the diaphragm side surface of the second lens L12 and the radius of curvature r5 of the object side of the third lens L13.

$$r4 \geq r5 \qquad (6)$$

The inequality (6) is to be satisfied in order to shape the two lenses concentrically with the diaphragm S and to facilitate the correction of off-axis aberrations.

Further if the diaphragm side surface r6 of the third lens L13 is made markedly concave, it is possible to reduce the Petzval's sum to facilitate the correction of astigmatic difference that is difficult at wide angles of view and to satisfactorily correct the spherical aberration occurring in the under direction at the object side surface r3 of the second lens L12.

Furthermore, it is desired that the focal length f1 of the first lens L11 and the focal length f of the entire lens system satisfy the conditional inequality (7) given below.

$$-2.5f < f1 < -1.0f \qquad (7)$$

The inequality (7), when satisfied, decreases the angle of view of incident rays on the positive lens unit B and decreases the overall length of the lens system. If the focal length f1 is below the lower limit value of the inequality (7), the difference between the conversion angles of inclination α and α0 decreases, making it impossible to greatly decrease the angle of view for the positive lens unit B and therefore presenting difficulty in correcting off-axis aberrations. Beyond the upper limit value, the first lens L11 has too great a negative refracting power to compact the lens system. The lens system of the second embodiment realizes a wide angle of view (2ω=about 86°) and is yet so compact that it is about 0.35 in telescopic ratio (overall length of lens system/focal length of entire system).

It is also desired that the following conditional inequality (8) be satisfied by the radius of curvature r3 of the image side surface of the second lens L12 and the radius of curvature r6 of the image side of the third lens L13.

$$1.0 < r3/r6 < 1.5 \qquad (8)$$

The inequality (8) serves to adequately correct the off-axis astigmatic difference and is useful especially for correcting this difference on the meridional side. If the upper limit value of the inequality (8) is exceeded, it becomes difficult to correct the off-axis coma aberration. Beyond the lower limit value, the curvature of field becomes corrected excessively on the meridional side to result in an increased astigmatic difference and impair the image surface and the uniformity of images.

It is further desired that the second lens L12 and the third lens L13 satisfy the following conditional inequalities (9) and (10):

$$N2 - N3 > 0.05 \qquad (9)$$

$$\nu2 - \nu3 > 6.0 \qquad (10)$$

wherein N2 and N3 are the refractive indexes of the respective second and third lenses, and ν2 and ν3 are the Abbe numbers thereof.

The inequality (9), when satisfied, serves to diminish Petzval's sum and hold the image surface planar. The inequality (10) serves to satisfactorily correct off-axis chromatic aberrations.

Tables 7 to 10 show specific numerical values for Examples 7 to 10 shown in FIGS. 16, 18, 20 and 22, respectively.

In Examples 9 and 10, the second lens unit comprising the second and third lenses and the fifth lens unit comprising the sixth and seventh lenses are each in the form of a compound lens composed of the two lenses affixed to each other.

The second embodiment described provides a compact lens system which exhibits very excellent performance in projecting images each with a satisfactory quality in its entirety although having an extremely wide angle of view.

TABLE 7

Figure 16:
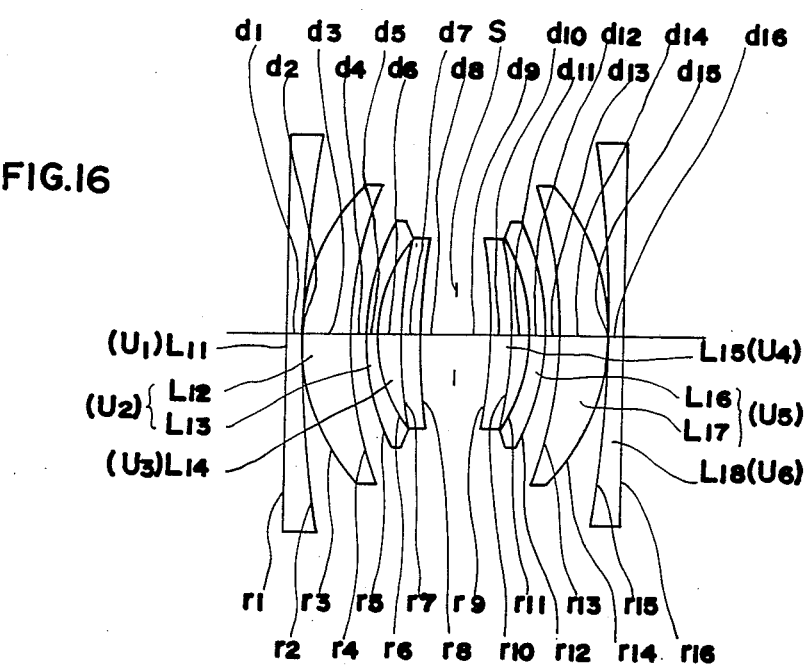
FIGS. 16, 18, 20 and 22 are diagrams respectively showing the constructions of Examples 7 to 10 included in the second embodiment.
Figure 17:
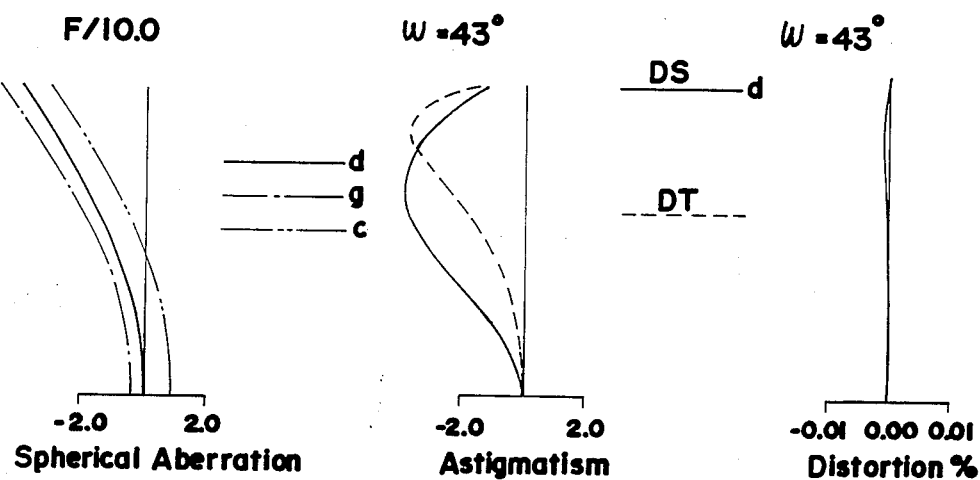
FIGS. 17, 19, 21 and 23 are diagrams respectively showing the aberration curves of Examples 7 to 10.

[Example 7; FIGS. 16 and 17]
f = 140.0   F No. = 10.0   2ω = 85.8

| Radius of curvature | Axial distance | Refractive index (Nd) | Abbe number (νd) |
|---|---|---|---|
| $r_1$   2072.925 |  |  |  |
|  | $d_1$   2.5 | $N_1$   1.59551 | $\nu_1$   39.23 |
| $r_2$   160.399 |  |  |  |
|  | $d_2$   0.2 |  |  |
| $r_3$   31.075 |  |  |  |
|  | $d_3$   7.0 | $N_2$   1.76500 | $\nu_2$   46.25 |
| $r_4$   58.629 |  |  |  |
|  | $d_4$   2.0 |  |  |
| $r_5$   33.894 |  |  |  |
|  | $d_5$   2.0 | $N_3$   1.68300 | $\nu_3$   31.52 |
| $r_6$   22.325 |  |  |  |
|  | $d_6$   3.0 |  |  |
| $r_7$   64.530 |  |  |  |
|  | $d_7$   3.1 | $N_4$   1.72000 | $\nu_4$   52.14 |
| $r_8$   98.811 |  |  |  |
|  | $d_8$   5.0 |  |  |
| S   — |  |  |  |
|  | $d_9$   5.0 |  |  |
| $r_9$   −98.811 |  |  |  |
|  | $d_{10}$   3.1 | $N_5$   1.72000 | $\nu_5$   52.14 |
| $r_{10}$   −64.530 |  |  |  |
|  | $d_{11}$   3.0 |  |  |
| $r_{11}$   −22.325 |  |  |  |
|  | $d_{12}$   2.0 | $N_6$   1.68300 | $\nu_6$   31.52 |
| $r_{12}$   −33.894 |  |  |  |
|  | $d_{13}$   2.0 |  |  |
| $r_{13}$   −58.629 |  |  |  |
|  | $d_{14}$   7.0 | $N_7$   1.76500 | $\nu_7$   46.25 |
| $r_{14}$   −31.075 |  |  |  |
|  | $d_{15}$   0.2 |  |  |
| $r_{15}$   −160.399 |  |  |  |
|  | $d_{16}$   2.5 | $N_8$   1.59551 | $\nu_8$   39.23 |
| $r_{16}$   −2072.925 |  |  |  |

Σd = 49.6
d/f = 0.355   r4/r5 = 1.73   f1/f = −2.09

TABLE 7-continued

[Example 7; FIGS. 16 and 17]

| f = 140.0 | F No. = 10.0 | 2ω = 85.8 | |
|---|---|---|---|
| Radius of curvature | Axial distance | Refractive index (Nd) | Abbe number (νd) |
| $r_3/r_6 = 1.39$ | $N_2-N_3 = 0.082$ | $\nu_2-\nu_3 = 14.73$ | |

TABLE 8

Figure 18:
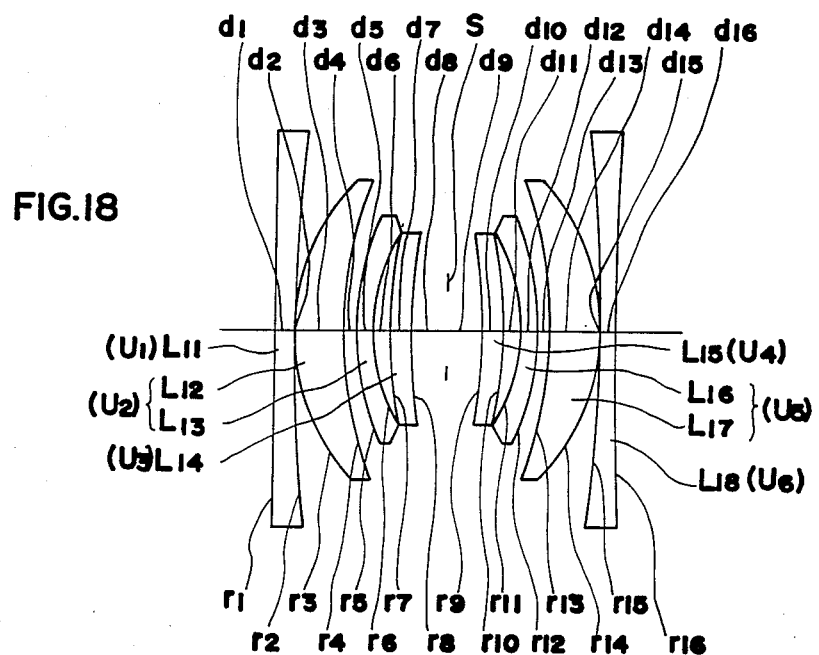
Figure 19:
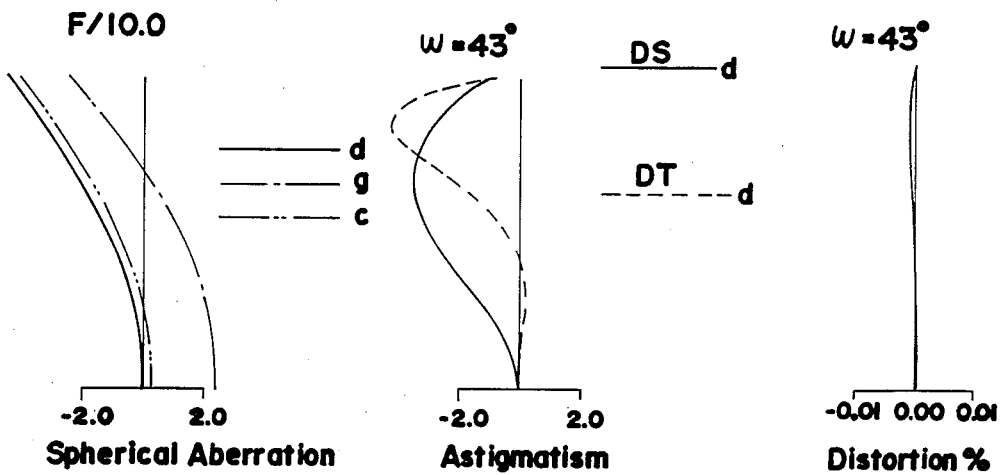

[Example 8; FIGS. 18 and 19]

f = 140.0    F No. = 10.0    2ω = 85.8

| Radius of curvature | | Axial distance | Refractive index (Nd) | | Abbe number (νd) | |
|---|---|---|---|---|---|---|
| $r_1$ | −703.838 | | | | | |
| | | $d_1$ 2.5 | $N_1$ 1.59551 | $\nu_1$ | 39.23 | |
| $r_2$ | 262.180 | | | | | |
| | | $d_2$ 0.2 | | | | |
| $r_3$ | 30.813 | | | | | |
| | | $d_3$ 7.0 | $N_2$ 1.76500 | $\nu_2$ | 46.25 | |
| $r_4$ | 57.694 | | | | | |
| | | $d_4$ 2.0 | | | | |
| $r_5$ | 39.169 | | | | | |
| | | $d_5$ 2.0 | $N_3$ 1.68300 | $\nu_3$ | 31.52 | |
| $r_6$ | 23.270 | | | | | |
| | | $d_6$ 3.0 | | | | |
| $r_7$ | 61.902 | | | | | |
| | | $d_7$ 3.1 | $N_4$ 1.72000 | $\nu_4$ | 52.14 | |
| $r_8$ | 109.469 | | | | | |
| | | $d_8$ 5.0 | | | | |
| S | — | | | | | |
| | | $d_9$ 5.0 | | | | |
| $r_9$ | −109.469 | | | | | |
| | | $d_{10}$ 3.1 | $N_5$ 1.72000 | $\nu_5$ | 52.14 | |
| $r_{10}$ | −61.902 | | | | | |
| | | $d_{11}$ 3.0 | | | | |
| $r_{11}$ | −23.270 | | | | | |
| | | $d_{12}$ 2.0 | $N_6$ 1.68300 | $\nu_6$ | 31.52 | |
| $r_{12}$ | −39.169 | | | | | |
| | | $d_{13}$ 2.0 | | | | |
| $r_{13}$ | −57.694 | | | | | |
| | | $d_{14}$ 7.0 | $N_7$ 1.76500 | $\nu_7$ | 46.25 | |
| $r_{14}$ | −30.813 | | | | | |
| | | $d_{15}$ 0.2 | | | | |
| $r_{15}$ | −262.180 | | | | | |
| | | $d_{16}$ 2.5 | $N_8$ 1.59551 | $\nu_8$ | 39.23 | |
| $r_{16}$ | 703.838 | | | | | |

Σd = 49.6
d/f = 0.355    $r_4/r_5$ = 1.47    $f_1/f$ = −2.29
$r_3/r_6$ = 1.32    $N_2-N_3$ = 0.082    $\nu_2-\nu_3$ = 14.73

TABLE 9

Figure 20:
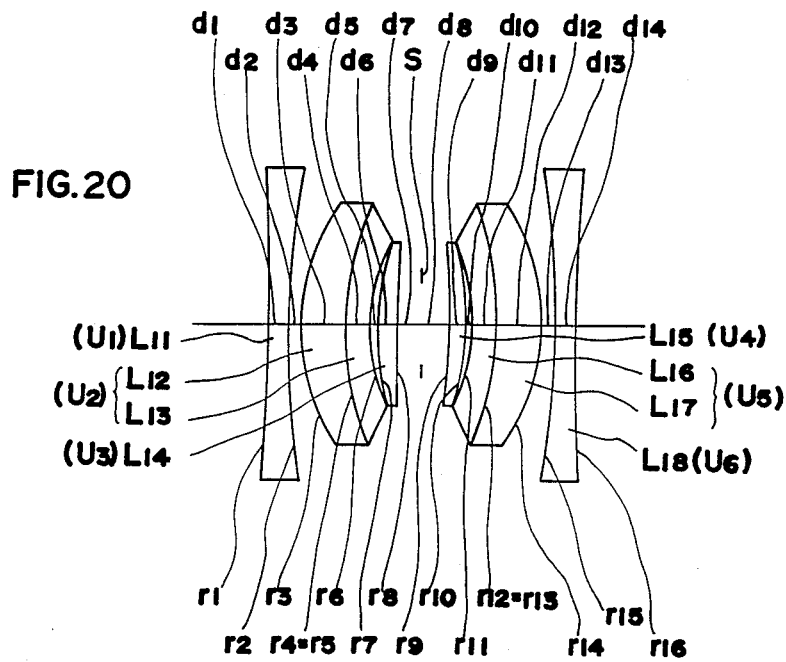
Figure 21:
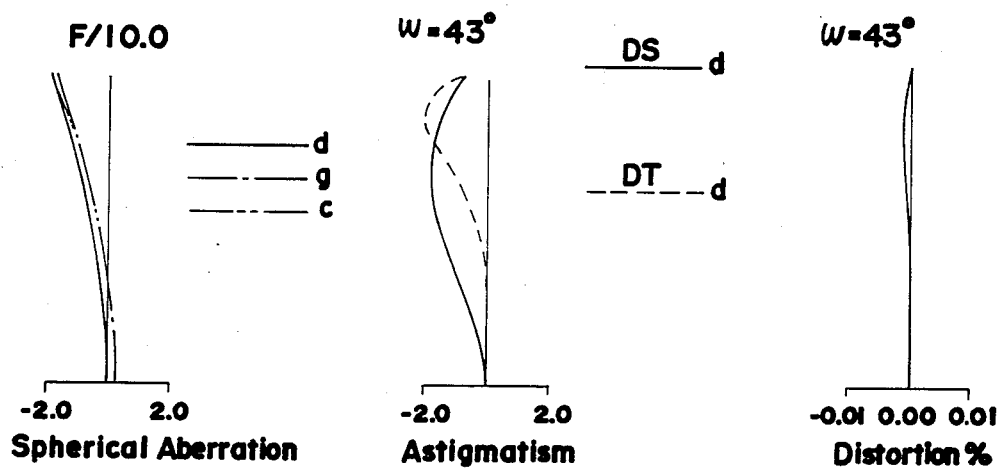

[Example 9; FIGS. 20 and 21]

f = 140.0    F No. = 10.0    2ω = 85.8

| Radius of curvature | | Axial distance | Refractive index (Nd) | | Abbe number (νd) |
|---|---|---|---|---|---|
| $r_1$ | −352.103 | | | | |
| | | $d_1$ 3.2 | $N_1$ 1.59551 | $\nu_1$ | 39.23 |
| $r_2$ | 130.436 | | | | |
| | | $d_2$ 1.9 | | | |
| $r_3$ | 29.936 | | | | |
| | | $d_3$ 6.4 | $N_2$ 1.77551 | $\nu_2$ | 37.90 |
| $r_4 = r_5$ | 43.583 | | | | |
| | | $d_4$ 3.6 | $N_3$ 1.68300 | $\nu_3$ | 31.52 |
| $r_6$ | 24.458 | | | | |
| | | $d_5$ 1.3 | | | |
| $r_7$ | 45.773 | | | | |
| | | $d_6$ 2.1 | $N_4$ 1.72000 | $\nu_4$ | 52.14 |
| $r_8$ | 208.016 | | | | |
| | | $d_7$ 4.0 | | | |
| S | — | | | | |
| | | $d_8$ 4.0 | | | |
| $r_9$ | −208.016 | | | | |
| | | $d_9$ 2.1 | $N_5$ 1.72000 | $\nu_5$ | 52.14 |
| $r_{10}$ | −45.773 | | | | |
| | | $d_{10}$ 1.3 | | | |
| $r_{11}$ | −24.458 | | | | |
| | | $d_{11}$ 3.6 | $N_6$ 1.68300 | $\nu_6$ | 31.52 |
| $r_{12} = r_{13}$ | −43.583 | | | | |

TABLE 9-continued

[Example 9; FIGS. 20 and 21]

f = 140.0    F No. = 10.0    2ω = 85.8

| Radius of curvature | | Axial distance | Refractive index (Nd) | | Abbe number (νd) |
|---|---|---|---|---|---|
| | | $d_{12}$ 6.4 | $N_7$ 1.77551 | $\nu_7$ | 37.90 |
| $r_{14}$ | −29.936 | | | | |
| | | $d_{13}$ 1.9 | | | |
| $r_{15}$ | −130.436 | | | | |
| | | $d_{14}$ 3.2 | $N_8$ 1.59551 | $\nu_8$ | 39.23 |
| $r_{16}$ | 352.103 | | | | |

Σd = 45.0
d/f = 0.321    $r_4/r_5$ = 1.00    $f_1/f$ = −1.139
$r_3/r_6$ = 1.22    $N_2-N_3$ = 0.093    $\nu_2-\nu_3$ = 6.38

TABLE 10

Figure 22:
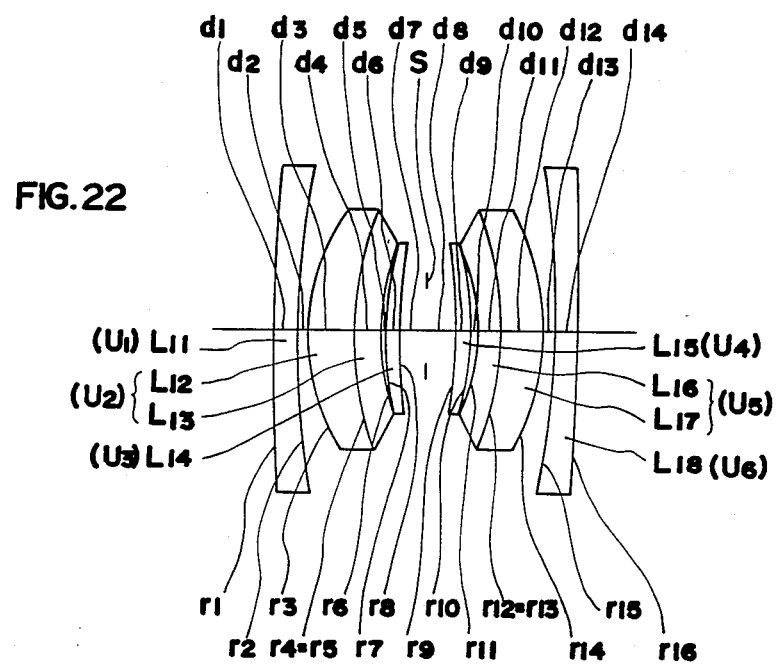
Figure 23:
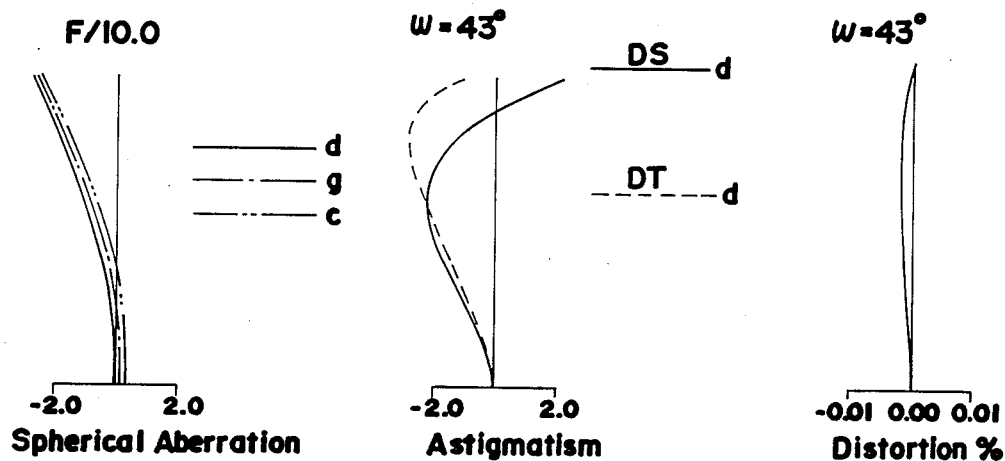

[Example 10; FIGS. 22 and 23]

f = 140.0    F No. = 10.0    2ω = 85.8

| Radius of curvature | | Axial distance | Refractive index (Nd) | | Abbe number (νd) |
|---|---|---|---|---|---|
| $r_1$ | 477.167 | | | | |
| | | $d_1$ 3.2 | $N_1$ 1.59551 | $\nu_1$ | 39.23 |
| $r_2$ | 117.959 | | | | |
| | | $d_2$ 1.9 | | | |
| $r_3$ | 33.095 | | | | |
| | | $d_3$ 6.4 | $N_2$ 1.78560 | $\nu_2$ | 42.81 |
| $r_4 = r_5$ | 45.366 | | | | |
| | | $d_4$ 3.6 | $N_3$ 1.64796 | $\nu_3$ | 31.23 |
| $r_6$ | 27.473 | | | | |
| | | $d_5$ 1.3 | | | |
| $r_7$ | 50.058 | | | | |
| | | $d_6$ 2.1 | $N_4$ 1.75450 | $\nu_4$ | 51.57 |
| $r_8$ | 119.780 | | | | |
| | | $d_7$ 4.0 | | | |
| S | — | | | | |
| | | $d_8$ 4.0 | | | |
| $r_9$ | −119.780 | | | | |
| | | $d_9$ 2.1 | $N_5$ 1.75450 | $\nu_5$ | 51.57 |
| $r_{10}$ | −50.058 | | | | |
| | | $d_{10}$ 1.3 | | | |
| $r_{11}$ | −27.473 | | | | |
| | | $d_{11}$ 3.6 | $N_6$ 1.64769 | $\nu_6$ | 31.23 |
| $r_{12} = r_{13}$ | −45.366 | | | | |
| | | $d_{12}$ 6.4 | $N_7$ 1.78560 | $\nu_7$ | 42.81 |
| $r_{14}$ | −33.095 | | | | |
| | | $d_{13}$ 1.9 | | | |
| $r_{15}$ | −117.959 | | | | |
| | | $d_{14}$ 3.2 | $N_8$ 1.59551 | $\nu_8$ | 39.23 |
| $r_{16}$ | −477.167 | | | | |

Σd = 45.0
d/f = 0.321    $r_4/r_5$ = 1.00    $f_1/f$ = −1.885
$r_3/r_6$ = 1.20    $N_2-N_3$ = 0.093    $\nu_2-\nu_3$ = 11.58

THIRD EMBODIMENT

Figure 24:
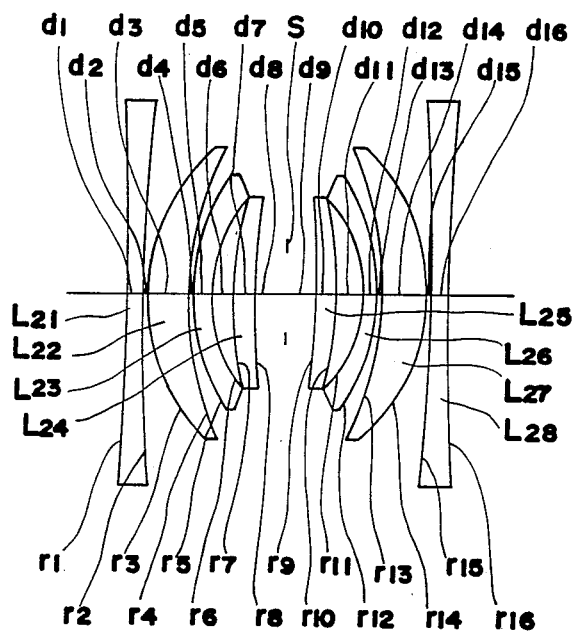
FIGS. 24 and 26 are diagrams respectively showing Examples 11 and 12 included in the third embodiment.
Figure 25:
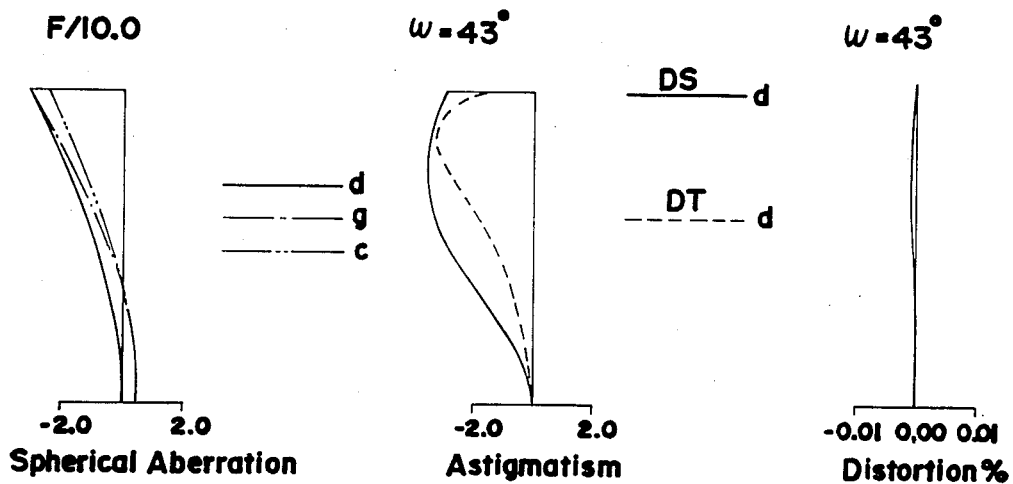
FIGS. 25 and 27 are diagrams respectively showing the aberration curves of Examples 11 and 12.
Figure 26:
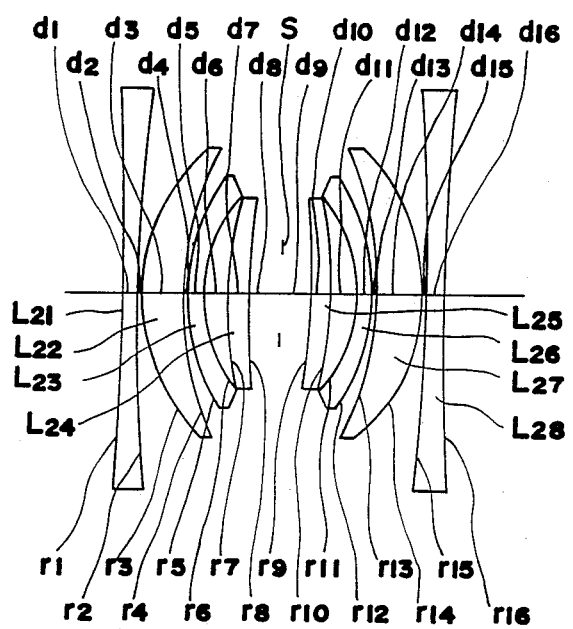
Figure 27:
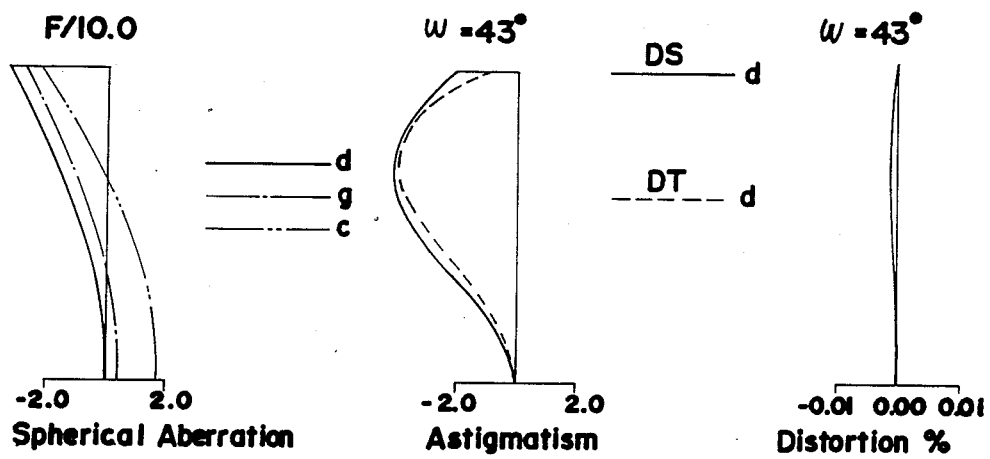

FIGS. 24 and 26 respectively show Examples 11 and 12 of wide angle lens systems according to the third embodiment. FIGS. 25 and 27 show the aberration curves of Examples 11 and 12, respectively.

The wide angle lens system of the third embodiment is similar in construction to the system of the second embodiment and comprises, as arranged from the object side toward the image side, a negative first lens L21, positive meniscus second lens L22 with a convex surface directed toward the object side, negative meniscus third lens L23 with a concave surface directed toward the image side, positive meniscus fourth lens L24 with a convex surface directed toward the object side, diaphragm S, positive meniscus fifth lens L25 symmetrical with the fourth lens L24 with respect to the diaphragm S and having a convex surface directed toward the image side, negative meniscus sixth lens L26 symmetrical with the third lens L23 with respect to the diaphragm S and having a concave surface directed toward the object side, positive meniscus seventh lens L27 symmetrical with the second lens L22 with respect to the diaphragm S and having a convex surface directed toward the image side, and negative eighth lens L28 symmetrical with the first lens L21 with respect to the diaphragm S. With the third embodiment, synthetic resin is used for making the negative first lens L21, positive meniscus fourth lens L24 with its convex surface directed toward the object side, positive meniscus fifth lens L25 with its convex surface directed toward the image side and negative eighth lens L28.

In the third embodiment as in the above embodiments, therefore, the first lens L21 corresponds to the negative lens unit A, the unit of the second lens L22, third lens L23 and fourth lens L24 to the positive lens unit B, the unit of the fifth lens L25, sixth lens L26 and seventh lens L27 to the positive lens unit B', and the eighth lens L28 to the negative lens unit A'. Thus, to provide a wide angle of view, the first lens L21 and the eighth lens L28 serve as the respective negative lens units A and A' and are adapted to give a decreased angle of view to the positive lens units B and B'.

Further with the third embodiment, the shift of the image point due to variations in temperature and peculiar to lens systems of synthetic resin is corrected by using a negative lens of polycarbonate or like resin as each of the first lens L21 and the eighth lens L28, and also using a positive lens of acrylic or like resin as each of the fourth lens L24 and the fifth lens L25. This collectively offsets variations in the focal lengths of the individual lenses. Since polycarbonate resin and acrylic resin are at the same level in respect of coefficient of linear expansion and variation coefficient of refractive index, it is desired that the focal length f1 of the first lens L21 and the focal length f4 of the fourth lens L24 satisfy the following conditional inequality (11).

$$-1.60 < f1/f4 < -0.95 \quad (11)$$

If the ratio f1/f4 is outside the range defined by the inequality (11), the image point shifts by at least 0.20 mm for a temperature variation of ±10° C. from the ambient temperature 20° C.

With the lens system of the third embodiment, it is desired that the radius of curvature r4 of the diaphragm side surface of the second lens L22 and the radius of curvature r5 of the object side of the third lens L23 satisfy the following conditional inequality (12) which is the same as the inequality (6) described with reference to the second embodiment.

$$r4 \geq r5 \quad (12)$$

It is also desired that the radius of curvature r3 of the image side surface of the second lens L22 and the radius of curvature r6 of the image side of the third lens L23 satisfy the following conditional inequality (13) which is the same as the inequality (8) described with reference to the second embodiment.

$$1.0 < r3/r6 < 1.5 \quad (13)$$

It is further desired that the second lens L22 and the third lens L23 satisfy the following inequalities (14), (15) which are the same as the inequalities (9), (10), respectively.

$$N2 - N3 > 0.05 \; (N7 - N6 > 0.05) \quad (14)$$

$$\nu 2 - \nu 3 > 6.0 \; (\nu 7 - \nu 6 > 6.0) \quad (15)$$

wherein N2 and N3 are the refractive indexes of the respective second and third lenses, and $\nu 2$ and $\nu 3$ are the Abbe numbers thereof.

In the case of the third embodiment as in the first embodiment, each of the first lens L21 and the eighth lens L28 may have at least one aspherical surface. In this case, the symmetrical lens surfaces of the first lens L21 and the eighth lens L28 are aspherical and in rotation symmetry with each other. The aspherical surface is preferably so shaped that as compared with the standard curvature, the refracting power increases in the negative direction with increasing distance from the optical axis, whereby the astigmatic difference can be corrected more efficiently.

Table 11 and Tables 12,(a) and (b) give specific numerical values for Examples 11 and 12 shown in FIGS. 24 and 26, respectively. The aspherical coefficients Ai in Table 12 (b) are defined by the foregoing equation (5).

All the lenses of Example 11 are spherical, while the first lens and the eighth lens of Example 12 are aspherical. In these examples, the first and eighth lenses are made of polycarbonate resin, and the fourth and fifth lenses are made of acrylic resin.

The third embodiment described above also realizes a wide angle lens system which is as compact as about 0.34 in telescopic ratio (overall length of lens system/focal length of entire system) although having a very wide angle of view ($2\omega =$ about 86°) and which exhibits exceedingly excellent performance in projecting images each with a satisfactory quality in its entirety. Of the eight component lenses, four lenses are made of synthetic resin, so that the wide angle lens system is lightweight and diminished in the likelihood of the image point shifting at varying temperatures.

In the foregoing description of the first to third embodiments, the conditional inequalities (3), (4) and (6) to (15) have been described with reference to the lenses positioned on the object side of the diaphragm. However, since the wide angle lens systems of the embodiments are symmetrical with respect to the diaphragm, it is to be noted that the lenses on the image side of the diaphragm of course similarly satisfy such inequalities.

TABLE 11

[Example 11; FIGS. 24 and 25]

| | f = 140.0 Radius of curvature | | F No. = 10.0 Axial distance | | $2\omega$ = 85.8 Refractive index (Nd) | | Abbe number ($\nu$d) |
|---|---|---|---|---|---|---|---|
| $r_1$ | −714.20 | | | | | | |
| | | $d_1$ | 2.5 | $N_1$ | 1.5840 | $\nu_1$ | 31.0 |
| $r_2$ | 256.21 | | | | | | |
| | | $d_2$ | 0.6 | | | | |
| $r_3$ | 26.72 | | | | | | |
| | | $d_3$ | 6.5 | $N_2$ | 1.7440 | $\nu_2$ | 44.9 |
| $r_4$ | 45.53 | | | | | | |
| | | $d_4$ | 0.8 | | | | |
| $r_5$ | 28.40 | | | | | | |
| | | $d_5$ | 2.2 | $N_3$ | 1.6830 | $\nu_3$ | 31.5 |
| $r_6$ | 19.15 | | | | | | |
| | | $d_6$ | 3.6 | | | | |
| $r_7$ | 67.33 | | | | | | |
| | | $d_7$ | 3.2 | $N_4$ | 1.4914 | $\nu_4$ | 57.8 |
| $r_8$ | 144.47 | | | | | | |
| | | $d_8$ | 4.5 | | | | |
| S | — | | | | | | |

TABLE 11-continued

[Example 11; FIGS. 24 and 25]

f = 140.0　　F No. = 10.0　　2ω = 85.8

| | Radius of curvature | | Axial distance | | Refractive index (Nd) | | Abbe number (νd) |
|---|---|---|---|---|---|---|---|
| | | $d_9$ | 4.5 | | | | |
| $r_9$ | −144.47 | | | | | | |
| | | $d_{10}$ | 3.2 | $N_5$ | 1.4914 | $\nu_5$ | 57.8 |
| $r_{10}$ | −67.33 | | | | | | |
| | | $d_{11}$ | 3.6 | | | | |
| $r_{11}$ | −19.15 | | | | | | |
| | | $d_{12}$ | 2.2 | $N_6$ | 1.6830 | $\nu_6$ | 31.5 |
| $r_{12}$ | −28.40 | | | | | | |
| | | $d_{13}$ | 0.8 | | | | |
| $r_{13}$ | −45.53 | | | | | | |
| | | $d_{14}$ | 6.5 | $N_7$ | 1.7440 | $\nu_7$ | 44.9 |
| $r_{14}$ | −26.72 | | | | | | |
| | | $d_{15}$ | 0.6 | | | | |
| $r_{15}$ | −256.21 | | | | | | |
| | | $d_{16}$ | 2.5 | $N_8$ | 1.5840 | $\nu_8$ | 31.0 |

| $r_{16}$ | 714.20 | | |
|---|---|---|---|
| | Σd = 47.8 | | |
| $f_1/f_4$ = −1.274 | | $r_3/r_6$ = 1.40 | |
| $N_2-N_3$ = 0.061 | | $\nu_2-\nu_3$ = 13.41 | |

TABLE 12 (a)

[Example 12; FIGS. 26 and 27]

f = 140.1　　F No. = 10.0　　2ω = 85.8

| | Radius of curvature | | Axial distance | | Refractive index (Nd) | | Abbe number (νd) |
|---|---|---|---|---|---|---|---|
| $r_1^*$ | −2668.30 | | | | | | |
| | | $d_1$ | 2.5 | $N_1$ | 1.5840 | $\nu_1$ | 31.0 |
| $r_2^*$ | 226.47 | | | | | | |
| | | $d_2$ | 0.6 | | | | |
| $r_3$ | 26.76 | | | | | | |
| | | $d_3$ | 6.5 | $N_2$ | 1.7440 | $\nu_2$ | 44.9 |
| $r_4$ | 46.13 | | | | | | |
| | | $d_4$ | 0.8 | | | | |
| $r_5$ | 29.83 | | | | | | |
| | | $d_5$ | 2.2 | $N_3$ | 1.6830 | $\nu_3$ | 31.5 |
| $r_6$ | 19.53 | | | | | | |
| | | $d_6$ | 3.6 | | | | |
| $r_7$ | 63.23 | | | | | | |
| | | $d_7$ | 3.2 | $N_4$ | 1.4914 | $\nu_4$ | 57.8 |
| $r_8$ | 126.81 | | | | | | |
| | | $d_8$ | 4.5 | | | | |
| S | — | | | | | | |
| | | $d_9$ | 4.5 | | | | |
| $r_9$ | −126.81 | | | | | | |
| | | $d_{10}$ | 3.2 | $N_5$ | 1.4914 | $\nu_5$ | 57.8 |
| $r_{10}$ | −63.23 | | | | | | |
| | | $d_{11}$ | 3.6 | | | | |
| $r_{11}$ | −19.53 | | | | | | |
| | | $d_{12}$ | 2.2 | $N_6$ | 1.6830 | $\nu_6$ | 31.5 |
| $r_{12}$ | −29.83 | | | | | | |
| | | $d_{13}$ | 0.8 | | | | |
| $r_{13}$ | −46.13 | | | | | | |
| | | $d_{14}$ | 6.5 | $N_7$ | 1.7440 | $\nu_7$ | 44.9 |
| $r_{14}$ | −26.76 | | | | | | |
| | | $d_{15}$ | 0.6 | | | | |
| $r_{15}^*$ | −226.47 | | | | | | |
| | | $d_{16}$ | 2.5 | $N_8$ | 1.5840 | $\nu_8$ | 31.0 |
| $r_{16}^*$ | 2668.30 | | | | | | |

Σd = 47.8

$f_1/f_4$ = −1.415　　$r_3/r_6$ = 1.37
$N_2-N_3$ = 0.061　　$\nu_2-\nu_3$ = 13.41

TABLE 12 (b)

[Example 12]

| Aspherical coefficient | | | |
|---|---|---|---|
| $r_1$: | $A_2 = 0.0$ | $A_3 = 0.0$ | $A_4 = -0.31643 \times 10^{-7}$ |
| | $A_5 = 0.0$ | $A_6 = -0.70937 \times 10^{-11}$ | $A_7 = 0.0$ |
| | $A_8 = -0.96721 \times 10^{-14}$ | $A_9 = 0.0$ | $A_{10} = 0.10735 \times 10^{-15}$ |
| | $A_{11} = 0.0$ | $A_{12} = 0.0$ | $A_{13} = 0.0$ |
| | $A_{14} = 0.0$ | $A_{15} = 0.0$ | $A_{16} = 0.0$ |
| $r_2$: | $A_2 = 0.0$ | $A_3 = 0.0$ | $A_4 = 0.16835 \times 10^{-17}$ |
| | $A_5 = 0.0$ | $A_6 = 0.77078 \times 10^{-18}$ | $A_7 = 0.0$ |
| | $A_8 = 0.38007 \times 10^{-18}$ | $A_9 = 0.0$ | $A_{10} = 0.44203 \times 10^{-16}$ |
| | $A_{11} = 0.0$ | $A_{12} = 0.20398 \times 10^{-18}$ | $A_{13} = 0.0$ |
| | $A_{14} = 0.0$ | $A_{15} = 0.0$ | $A_{16} = 0.0$ |
| $r_{15}$: | $A_2 = 0.0$ | $A_3 = 0.0$ | $A_4 = -0.16835 \times 10^{-17}$ |
| | $A_5 = 0.0$ | $A_6 = -0.77078 \times 10^{-18}$ | $A_7 = 0.0$ |
| | $A_8 = -0.38007 \times 10^{-18}$ | $A_9 = 0.0$ | $A_{10} = -0.44203 \times 10^{-16}$ |
| | $A_{11} = 0.0$ | $A_{12} = -0.20398 \times 10^{-18}$ | $A_{13} = 0.0$ |
| | $A_{14} = 0.0$ | $A_{15} = 0.0$ | $A_{16} = 0.0$ |
| $r_{16}$: | $A_2 = 0.0$ | $A_3 = 0.0$ | $A_4 = 0.31643 \times 10^{-7}$ |
| | $A_5 = 0.0$ | $A_6 = 0.70937 \times 10^{-11}$ | $A_7 = 0.0$ |
| | $A_8 = 0.96721 \times 10^{-14}$ | $A_9 = 0.0$ | $A_{10} = -0.10735 \times 10^{-15}$ |
| | $A_{11} = 0.0$ | $A_{12} = 0.0$ | $A_{13} = 0.0$ |
| | $A_{14} = 0.0$ | $A_{15} = 0.0$ | $A_{16} = 0.0$ |

In the foregoing description of the first to third embodiments, the conditional inequalities (3), (4) and (6) to (15) have been described with reference to the lenses positioned on the object side of the diaphragm. However, since the wide angle lens system of the embodiments are symmetrical with respect to the diaphragm, it is to be noted that the lenses on the image side of the diaphragm of course similarly satisfy such inequalities.

Moreover, in all of the Examples 1 to 12, a lens element having a convex surface at one side and a concave surface at another side is a meniscus lens Although the present invention has been fully described by the way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A wide angle lens system comprising, from the object side
   a first lens element of a negative refractive power having an aspherical surface,
   a second lens element of a positive refractive power,
   a third lens element of a negative refractive power,
   a fourth lens element of a positive refractive power,
   a diaphragm,
   a fifth lens element of a positive refractive power, a sixth lens element of a negative refractive power, a seventh lens element of a positive refractive power, and a eighth lens element of a negative refractive power having an aspherical surface which is in rotation symmetry with the aspherical surface of the first lens element with respect to the diaphragm.

2. A wide angle lens system as claimed in claim 1, wherein the aspherical surfaces of the first and eighth lens elements are so shaped that the refractive power increases in the negative direction with an increase in the distance from the optical axis.

3. A wide angle lens system for use in a copying machine, the lens system comprising, from the object side, a first lens element of a negative refractive power having an aspherical surface, a second lens element consisting of a positive meniscus lens element having a convex surface faced to the object side, a third lens element consisting of a negative meniscus lens element having a convex surface faced to the object side, a fourth lens element consisting of a positive meniscus lens element having a convex surface faced to the object side, a diaphragm, a fifth lens element being symmetrical with the fourth lens element with respect to the diaphragm, a sixth lens element being symmetrical with the third lens element with respect to the diaphragm, a seventh lens element being symmetrical with the second lens element with respect to the diaphragm, and a eighth lens element being arranged symmetrically with the first lens element and shaped to have an aspherical surface which is in rotation symmetry with the aspherical surface of the first lens element with respect to the diaphragm.

4. A wide angle lens system as claimed in claim 3, wherein the aspherical surfaces of the first and eighth lens elements are so shaped that the refractive power increases in the negative direction with an increase in the distance from the optical axis.

5. A wide angle lens system as claimed in claim 3, wherein the lens system fulfills the following condition, $$r4 \geqq r5$$

r4: the radius of curvature of the diaphragm side surface of the second lens element r5: the radius of curvature of the object side surface of the third lens element.

6. A wide angle lens system as claimed in claim 3, wherein the lens system fulfills the following condition, $$-2.5f < f1 < -1.0f$$

f1: the focal length of the first lens element
f: the focal length of the entire lens system.

7. A wide angle lens system as claimed in claim 3, wherein both of the first and eighth lens elements are made of synthetic resin.

8. A wide angle lens system comprising, from the object side, a first lens unit consisting of a negative lens element, a second lens unit consisting of a positive meniscus lens element having a convex surface faced to the object side and a negative meniscus lens element having a concave surface faced to the image side, a third lens unit consisting of a positive meniscus lens element having a convex surface faced to the object side, a diaphragm, a fourth lens unit being symmetrical with the third lens unit with respect to the diaphragm, a fifth lens unit being symmetrical with the second lens unit with respect to the diaphragm, and a sixth lens unit being symmetrical with the first lens unit with respect to the diaphragm, wherein the lens system fulfilling the following condition, $$r4 \geqq r5$$

r4: the radius of curvature of the diaphragm side surface of the positive meniscus lens element of the second lens unit r5: the radius of curvature of the object side surface of the negative meniscus lens element of the third lens unit.

9. A wide angle lens system as claimed in claim 8, wherein the lens system fulfills the following condition, $$-2.5f < f1 < -1.0f$$

f1: the focal length of the negative lens element of the first lens unit
f: the focal length of the entire lens system.

10. A wide angle lens system as claimed in claim 8, wherein the lens system fulfills the following condition, $$1.0 < r3/r6 < 1.5$$

r3: the radius of curvature of the object side surface of the positive meniscus lens element of the second lens unit r6: the radius of curvature of the diaphragm side surface of the negative meniscus lens element of the third lens unit.

11. A wide angle lens system as claimed in claim 9, wherein the lens system fulfills the following condition, $$1.0 < r3/r6 < 1.5$$

r3: the radius of curvature of the object side surface of the positive meniscus lens element of the second lens unit r6: the radius of curvature of the diaphragm side surface of the negative meniscus lens element of the third lens unit.

12. A wide angle lens system as claimed in claim 8, wherein the lens system fulfills the following conditions, $$N2 - N3 > 0.05$$

$$\nu2 - \nu3 > 6.0$$

N2: the refractive index of the positive meniscus lens element of the second lens unit N3: the refractive index of the negative meniscus lens element of the second lens unit $\nu$2: the Abbe number of the positive meniscus lens element of the second lens unit $\nu$3: the Abbe number of the negative meniscus lens element of the second lens unit.

13. A wide angle lens system comprising, from the object side,

- a first lens unit consisting of a negative lens element of synthetic resin,
- a second lens unit consisting of a positive meniscus lens element having a convex surface faced to the object side and a negative meniscus lens element having a concave surface faced to the image side,
- a third lens unit consisting of a positive meniscus lens element of synthetic resin having a convex surface faced to the object side,
- a diaphragm,
- a fourth lens unit being symmetrical with the third lens unit with respect to the diaphragm,
- a fifth lens unit being symmetrical with the second lens unit with respect to the diaphragm, and
- a sixth lens unit being symmetrical with the first lens unit with respect to the diaphragm.

14. A wide angle lens system as claimed in claim 13, wherein the first, third, fourth and sixth lens units are so arranged as to correct the shift of the image point due to a variation in temperature.

15. A wide angle lens system as claimed in claim 13, wherein the lens system fulfills the following condition, $$-1.6 < f1/f4 < -0.95$$

f1: the focal length of the negative lens element of the first lens unit f4: the focal length of the positive meniscus lens element of the third lens unit.

16. A wide angle lens system as claimed in claim 13, wherein the lens system fulfills the following condition, $$1.0 < r3/r6 < 1.5$$

r3: the radius of curvature of the object side surface of the positive meniscus lens element of the second lens unit r6: the radius of curvature of the diaphragm side surface of the negative meniscus lens element of the third lens element.

17. A wide angle lens system as claimed in claim 13, wherein the lens system fulfills the following conditions, $$N2 - N3 > 0.05$$

$$\nu2 - \nu3 > 6.0$$

N2: the refractive index of the positive meniscus lens element of the second lens unit N3: the refractive index of the negative meniscus lens element of the second lens unit $\nu$2: the Abbe number of the positive meniscus lens element of the second lens unit $\nu$3: the Abbe number of the negative meniscus lens element of the second lens unit.

18. A wide angle lens system as claimed in claim 13, wherein the negative lens element of the first lens unit has an aspherical surface, while the negative lens element of the sixth lens unit has an aspherical surface which is in rotation symmetry with the aspherical surface of the first lens unit with respect to the diaphragm.

* * * * *